United States Patent
Aoki et al.

[11] Patent Number: 5,998,609
[45] Date of Patent: Dec. 7, 1999

[54] PHTHALOCYANINE COMPOUNDS, PROCESS FOR PREPARING THE SAME, AND OPTICAL RECORDING MEDIUM MADE USING THE SAME

[75] Inventors: Minoru Aoki; Osamu Kaieda; Kiyoshi Masuda; Yasunori Okumura, all of Ibrakai, Japan

[73] Assignee: Nippon Shokubai Co., Ltd., Japan

[21] Appl. No.: 09/077,990

[22] Filed: Jun. 12, 1998

Related U.S. Application Data

[63] Continuation of application No. PCT/JP97/02679, Aug. 1, 1997.

[51] Int. Cl.⁶ .............................. C09B 47/04; G03G 5/06
[52] U.S. Cl. .......................... 540/140; 540/122; 540/139; 428/64.1
[58] Field of Search .................................. 540/122, 139, 540/140; 428/64.1

[56] References Cited

U.S. PATENT DOCUMENTS

| 5,409,634 | 4/1995 | Itoh et al. | 540/140 |

FOREIGN PATENT DOCUMENTS

| 0 484 027 A1 | 5/1992 | European Pat. Off. |
| 0 638 614 A1 | 2/1995 | European Pat. Off. |
| A-58-56892 | 4/1983 | Japan |
| A-61-246091 | 11/1986 | Japan |
| A-63-37991 | 2/1988 | Japan |
| 1045474 | of 1989 | Japan |
| A-1-42283 | 2/1989 | Japan |
| A-2-265788 | 10/1990 | Japan |
| A-2-276677 | 11/1990 | Japan |
| A-32-15466 | 9/1991 | Japan |
| A-4-226390 | 8/1992 | Japan |
| A-5-1272 | 1/1993 | Japan |
| A-5-345861 | 12/1993 | Japan |
| 6-107662 | 4/1994 | Japan |
| A-6-107663 | 4/1994 | Japan |
| A-6-328856 | 11/1994 | Japan |
| 7-70458 | 3/1995 | Japan |
| 158841 | 5/1996 | Japan |
| A-8-225751 | 9/1996 | Japan |
| 8-324121 | 12/1996 | Japan |

*Primary Examiner*—Mukund J. Shah
*Assistant Examiner*—Pavanaram K Sripada
*Attorney, Agent, or Firm*—Fish & Richardson P.C.

[57] ABSTRACT

A phthalocyanine compound of a structural formula of phthalocyanine represented by the general formula (1):

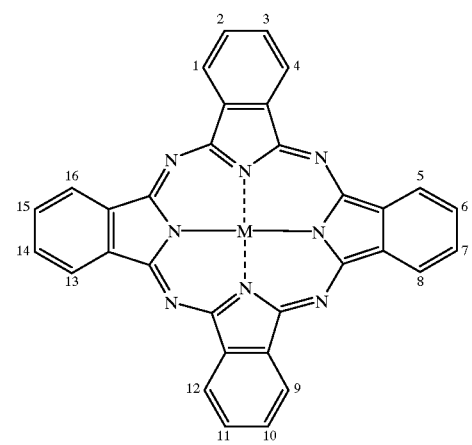

(1)

wherein 1 to 8 of a total 16 positions are substituted with a phenoxy group, the phenoxy group at either of the ortho positions is substituted with an aryl group which may be substituted, all the atoms in the aryl group and the substituents at the residual ortho positions excluding the hydrogen atoms assume a total atomic radius of not less than 6.0 Å, and a central atom group M contains a metal atom of not less than trivalence, a bromine-substituent of the compound, a phthalocyanine composition comprising the phthalocyanine compound and the bromine atom-containing phthalocyanine compound, and an optical recording medium containing it in a recording layer.

25 Claims, No Drawings

5,998,609

PHTHALOCYANINE COMPOUNDS, PROCESS FOR PREPARING THE SAME, AND OPTICAL RECORDING MEDIUM MADE USING THE SAME

This is a continuation of International Patent Application No. PCT/JP97/02679, with an international filing date of Aug. 1, 1997, now pending.

TECHNICAL FIELD

This invention relates to a novel phthalocyanine compound, a method for the production thereof, and an optical recording medium using the compound. Since the novel phthalocyanine compound according to this invention possesses an absorption band in the near-infrared absorption region of 600 to 1000 nm and excels in solubility, it manifests outstanding effects when it is used as a near-infrared ray-absorbing material to be used as an optical recording medium using a semiconductor laser, a near-infrared absorption dye for writing and reading in a liquid-crystal display and an optical character reader, a near-infrared sensitizer, a photothermal conversion agent for thermosensitive transfer, a thermosensitive paper and a thermosensitive stenciler, a near-infrared ray-absorbing filter, an eye fatigue-inhibitor, and a photoelectrically conducting material, as well as to be used in a color separating filter for a camera tube, a liquid-crystal display element, a color Braun tube selective absorption filter, a color toner, an ink-jet grade ink, a bar code grade ink for prevention of alteration and forgery, a microorganism unactivating agent, a photosensitive dye for therapy of tumors, etc.

Further, this phthalocyanine compound manifests veritable excellent effects particularly when used as a near-infrared absorption dye for the postscript type optical recording medium adapted for a compact disc.

BACKGROUND ART

In recent years, the development of such optical recording media as compact discs, laser discs, optical memory discs, and optical cards which utilize a semiconductor laser as the light source has been advancing actively. Particularly, CD, PHOTO-CD, and CD-ROM have been used in large quantities as a large-volume and high-speed access digital recording medium for the storage and reproduction of voices, images, and code data. These systems invariably so-called a near-infrared absorption dye which is sensible of the semiconductor laser. The demand for such a material as excels in characteristics in terms of a dye has been finding growing recognition.

Numerous phthalocyanine-based compounds which are stable against light, heat, temperature, and the like and excel in fastness have been the subjects of current researches among other dyes.

The characteristics to be demanded by such a phthalocyanine compound when used as a postscript type optical recording medium adapted for a compact disc are as follows:

(1) The maximum absorption wavelength of the thin film should be controlled within the range of 700 to 730 nm (which constitute themselves the principal constructional factors relative to such optical properties as reflectance by decreasing peaks due to association thereby improving absorbancy and sharpening the peaks);

(2) The compound should be capable of being applied on a substrate by a method which can be carried out conveniently and at a high yield like by spin-coating, and excels in solubility in a solvent which does not erode a substrate.

(3) The compound should excel in heat-resistance and lightfastness.

(4) The compound should manifest excellent heat-decomposition properties (which constitutes a principal constructional factor relative to sensitivity).

(5) The compound should warrant excellent economy as for the method to be adopted for the manufacture thereof.

JP-A-58-56,892, for example, has proposed a method which uses a perfluorophthalocyanine compound. These compounds, however, manifests poor solubility in an organic solvent and fails to permit satisfactory control of the absorption wavelength.

JP-A-61-246,091, JP-A-63-37,991, JP-A-64-42,283, JP-A-02-276,677, JP-A-02-265,788, JP-A-03-215,466, and JP-A-04-226,390 have proposed compounds in which a substituent is introduced via oxygen into the benzene ring of a phthalocyanine skeleton. These compounds, however, are at a disadvantage in manifesting poor lightfastness or insufficient reflectance, depending on the kind, number, and position of substituents for dye, failing to be dissolved in a solvent which has been popularly adopted and can be directly applied to a substrate such as of polycarbonate, or incurring difficulty in the control of the absorption wavelength, for example.

As an invention which affords a comparative solution to the disadvantage, JP-A-05-1,272 has proposed a phthalocyanine having four alkoxy groups introduced at the a position thereof and having a halogen compound or its like introduced partially at the residual positions thereof. Any phthalocyanine which has introduced substituents at the a position thereof, however, is at such an economical disadvantage as being deficient in productivity from phthalonitrile as the raw material. The phthalocyanine compounds of this class do not satisfy all the characteristics and, therefore, are expected to possess further exalted characteristics.

We have heretofore proposed such phthalocyanine compounds as be substituted at the β position thereof with a phenoxy group possessed of a large substituent (JP-A-05-345,861, JP-A-06-107,663, JP-A-06-328,856, and JP-A-08-225,751). These compounds, however, still betray deficiency in reflectance, sensitivity, etc. when used in optical recording media. None of the phthalocyanine compounds proposed to date fully satisfy the characteristics as mentioned above.

The present invention has been produced in view of the problems which the prior art has had as mentioned above. To be specific, an object of this invention is to provide a novel phthalocyanine compound which allows the absorption to be appropriately controlled within the absorption wavelength region of 600 to 1000 nm, excels in solubility in a solvent suitable for a given application, such as, for example, an alcoholic solvent, and exhibits prominent heat-resistance and lightfastness.

Another object of this invention is to provide a method for producing the phthalocyanine compound efficiently and with high purity.

Still another object of this invention is to provide a phthalocyanine compound which, when applied to an optical recording medium, particularly an optical recording medium adapted to a compact disc, can exhibit outstanding effects in such characteristics as solubility, absorption wavelength, sensitivity, reflectance, lightfastness, and heat-decomposition properties which are indispensable for these applications.

Still further object of this invention to provide a phthalocyanine compound which can manifest outstanding effects in high-speed recording.

DISCLOSURE OF INVENTION

The objects mentioned above can be accomplished by the following items (1) to (23).

(1) A phthalocyanine compound of a structural formula of phthalocyanine represented by the general formula (1):

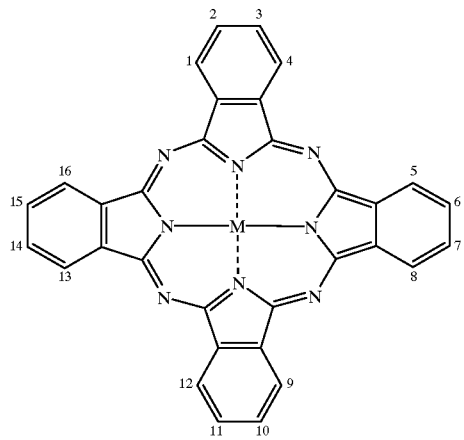

(1)

wherein 1 to 8 of a total 16 positions are substituted with a phenoxy group, one of the ortho positions of the phenoxy group being substituted with an aryl group which may be substituted, all the atoms in the aryl group and the substituent at the residual ortho position excluding the hydrogen atoms assume a total atomic radius of not less than 6.0 Å, and a central atom group M contains a metal atom of not less than trivalence.

(2) A phthalocyanine compound according to the (1) above, wherein the one of the ortho positions of the phenoxy group is substituted with the aryl group and at least other ortho position of the residual positions is substituted with at least one substituent selected from the group consisting of the substituents of the following (1) to (7) groups:

group (1) $R^1$
group (2) $CO_2R^2$
group (3) $CO_2(CH_2CH_2O)_aR^3$
group (4) $CO_2(CH_2CH_2CH_2O)_bR^4$
group (5) $O[(CH_2)_cO]_dR^5$
group (6) $CO_2(CH_2)_eR^6$

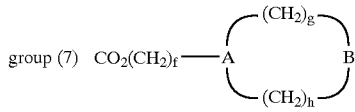

(wherein $R^1$ represents a linear, branched, or cyclic alkyl group of 1 to 20 carbon atoms which may be substituted or an aryl group which may be substituted, $R^2$, $R^3$, $R^4$, and $R^5$ independently represent a linear, branched, or cyclic alkyl group of 1 to 20 carbon atoms which may be substituted or an aryl group which may be substituted, $R^6$ represents an aryl group which may be substituted, A represents a CH group or a nitrogen atom, B represents an oxygen atom, a sulfur atom, a $CH_2$ group, an NH group, or an alkylamino group of 1 to 4 carbon atoms, a, b, c and e each represent an integer in the range of 1 to 5, d and f each represent an integer in the range of 0 to 6, and g and h independently represent an integer in the range of 1 to 4).

(3) A phthalocyanine compound according to the (2) above, which is represented by the general formula (2):

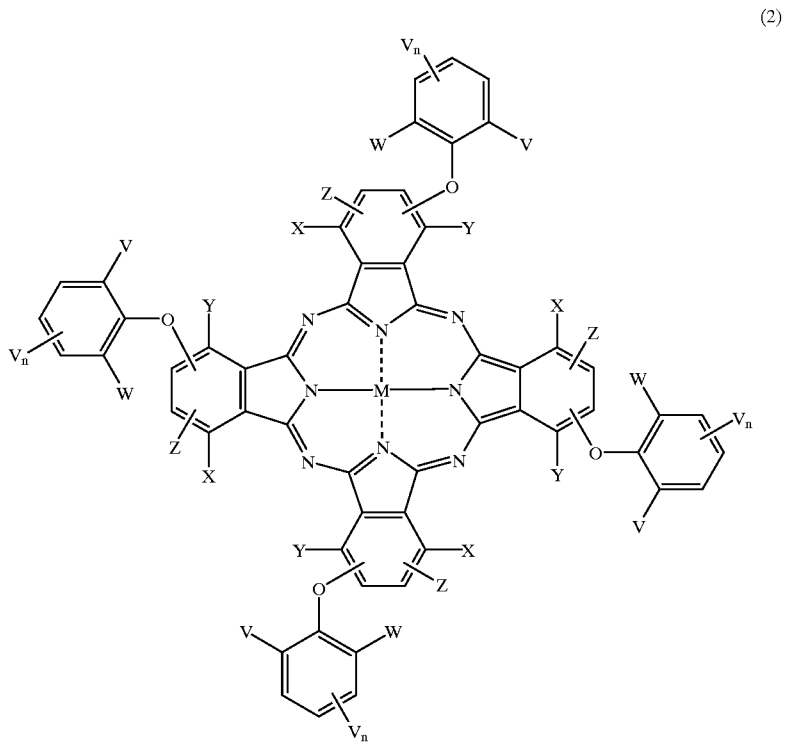

(2)

[wherein X, Y, and Z each represent a hydrogen atom or a halogen atom, W represents an aryl group which may be substituted, V represents at least one substituent selected from the class of the substituents of (1) to (7) groups as defined in the (2) above, n represents an integer in the range of 0 to 3, and M represents a metal group containing a metal of not less than trivalence].

(4) A phthalocyanine compound according to the (3) above, wherein at least one of X, Y, and Z in the general formula (2) is a fluorine atom.

(5) A phthalocyanine compound according to the (3) or (4) above, wherein in the general formula (2), V is $CO_2R^2$ (wherein $R^2$ represents a branched alkyl group of 3 to 20 carbon atoms which may be substituted).

(6) A phthalocyanine compound according to any one of the (3) to (5) above, wherein in the general formula (2), V is $CO_2R^2$ (wherein $R^2$ represents a substituted or unsubstituted secondary or tertiary alkyl group of 5 to 20 carbon atoms and containing 2 to 4 secondary or higher carbon atoms).

(7) A phthalocyanine compound according to any one of the (3) to (6) above, wherein in the general formula (2), V is $CO_2R^2$ (wherein $R^2$ represents a substituted or unsubstituted secondary or tertiary alkyl group of 6 to 10 carbon atoms and containing 2 to 4 secondary or higher carbon atoms), W is a phenyl group which may be substituted, M is a vanadyl, and X, Y, and Z are invariably a fluorine atom.

(8) A phthalocyanine compound of a structural formula of phthalocyanine represented by the general formula (1):

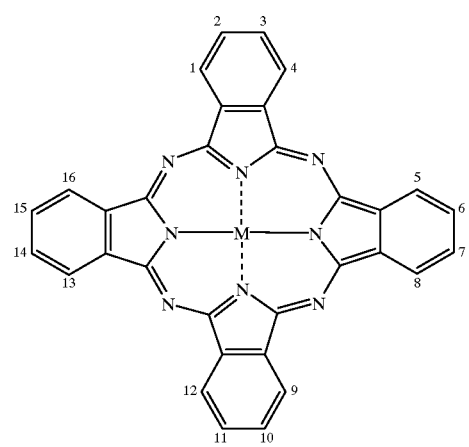

(1)

wherein 1 to 8 of a total 16 positions are substituted with a phenoxy group, one of the ortho positions of the phenoxy group being substituted with an aryl group which may be substituted while the other ortho position being substituted with a bromine atom-containing substituent, and all the atoms in the aryl group and the substituent at the residual ortho position excluding the hydrogen atoms assume a total atomic radius of not less than 6.0 Å.

(9) A phthalocyanine compound according to the (8) above, which is represented by the general formula (3):

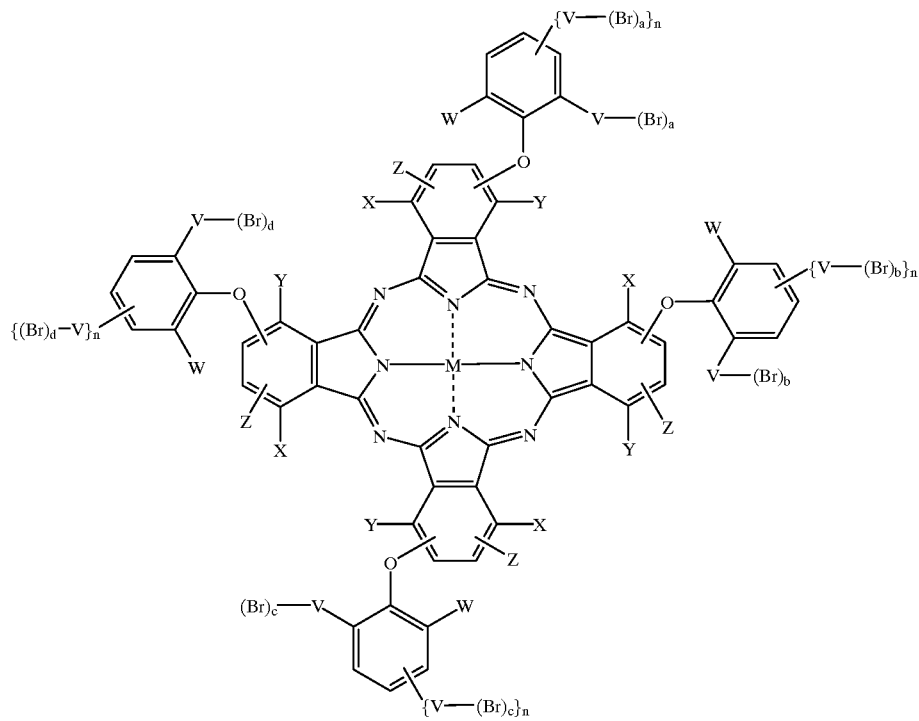

(3)

[wherein X, Y, and Z each represent a hydrogen atom or a halogen atom, a, b, c, and d each represent an integer in the range of 0 to 3, the total number of bromine atoms involved in the substitution is an integer in the range of 2 to 12, n represents an integer in the range of 0 to 3, W represents an aryl group which may be substituted, V represents at least one substituent selected among bromine-substituted residues of the substituents of the following (1) to (3) groups:

group (1) $R^7$
group (2) $CO_2R^8$
group (3) $O[(CH_2)_cO]_dR^9$ (wherein $R^7$, $R^8$, and $R^9$ independently represent a linear, branched, or cyclic alkyl group of 1 to 20 carbon atoms which may be substituted or an aryl group which may be substituted, c represents an integer in the range of 1 to 5, and d represents an integer in the range of 0 to 6) where a, b, c, and d each represent an integer in the range of 1 to 3 or at least one substituent selected among the substituents of (1) to (3) groups mentioned above where a, b, c, and d each represent 0, and M represents a metal, a metal oxide, or a halogenated metal].

(10) A phthalocyanine compound according to the (9) above, wherein in the general formula (3), at least one of X, Y, and Z is a fluorine atom.

(11) A phthalocyanine compound according to the (9) or (10) above, wherein in the general formula (3), V is $CO_2R^8$ (wherein $R^8$ represents a bromine-substituted residue of a branched alkyl group), W is a phenyl group which may be substituted, X, Y, and Z each represent a fluorine atom, and M is a vanadyl.

(12) A method for the production of a phthalocyanine compound set forth in any one of the (1) to (7) above, which comprises causing either a phthalonitrile compound alone substituted with a phenoxy group to be substituted with an aryl group which may be substituted, or a mixture of the phthalonitrile compound with a phthalonitrile to be unsubstituted with the phenoxy group to react with a metal compound.

(13) A method for the production of a phthalocyanine compound set forth in any one of the (8) to (11) above, which comprises causing either a phthalonitrile compound alone to be substituted with a phenoxy group to be substituted both with an aryl group which may be substituted and a bromine atom-containing substituent, or a mixture of the phthalonitrile compound with a phthalonitrile to be unsubstituted with the phenoxy group to react with a metal compound.

(14) A phthalocyanine composition containing at least one each of the phthalocyanine compounds of the group (I) and those of group (II) shown below:

Group (I): phthalocyanine compounds represented by the general formula (2):

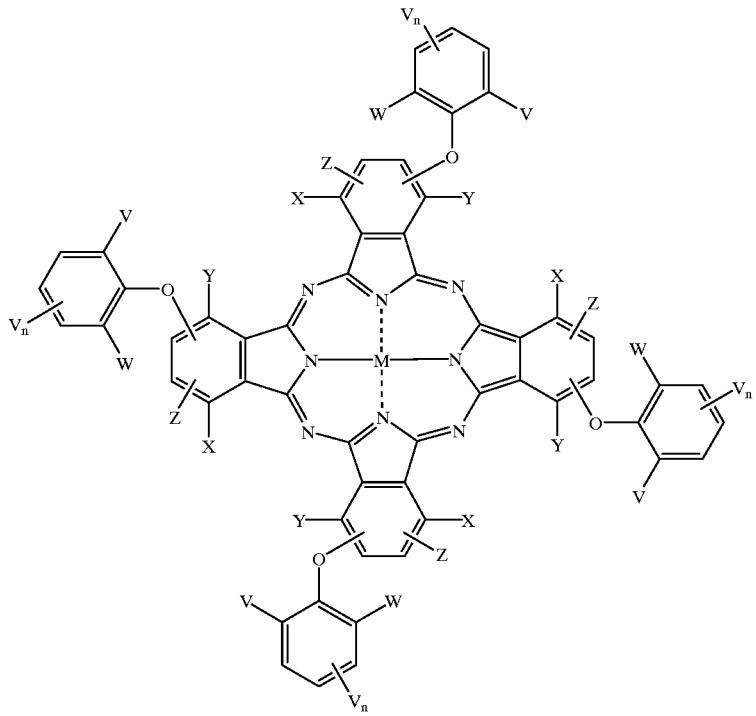

(2)

[wherein X, Y, and Z each represent a hydrogen atom or a halogen atom, W represents an aryl group which may be substituted, V represents at least one substituent selected from the class of the substituents of (1) to (7) groups as defined in the (2) above, n represents an integer in the range of 0 to 3, and M represents a metal, a metal oxide, or a halogenated metal]; and Group (II): bromine atom-containing phthalocyanine compounds.

(15) A phthalocyanine composition according to the (14) above, wherein the bromine atom-containing phthalocyanine compound of the group (II) is substituted with at least one alkoxy group or aryloxy group.

(16) A phthalocyanine composition according to the (14) or (15) above, wherein at least one of X, Y and Z in the general formula (2) is a fluorine atom, and the bromine atom-containing phthalocyanine compound is a compound represented by the general formula (3).

(17) A phthalocyanine composition according to any one of the (14) to (16) above, wherein V in the general formula (2) is $CO_2R^2$ (wherein $R^2$ represents a branched alkyl group of 3 to 20 carbon atoms which may be substituted), and the bromine atom-containing phthalocyanine compound is a compound represented by the general formula (3).

(18) A phthalocyanine composition according to any one of the (14) to (17) above, wherein V in the general formula (2) is $CO_2R^2$ (wherein $R^2$ represents a secondary or tertiary alkyl group of 5 to 20 carbon atoms and containing 2 to 4 secondary or higher carbon atoms which may be substituted), and the bromine atom-containing phthalocyanine compound is a compound represented by the general formula (3).

(19) A phthalocyanine composition according to the (14) or (15) above, wherein at least one of X, Y and Z in the general formula (2) is a fluorine atom, and the bromine atom-containing phthalocyanine compound is a compound represented by the general formula (3) (wherein at least one of X, Y and Z is a fluorine atom).

(20) A phthalocyanine composition according to any one of the (14), (15) and (19) above, wherein V in the general formula (2) is $CO_2R^2$ (wherein $R^2$ represents a branched alkyl group of 3 to 20 carbon atoms which may be substituted) and the bromine atom-containing phthalocyanine compound is a compound represented by the general formula (3) (wherein at least one of X, Y and Z is a fluorine atom).

(21) A phthalocyanine composition according to any one of the (14), (15), (19) and (20) above, wherein V in the general formula (2) is $CO_2R^2$ (wherein $R^2$ represents a secondary or tertiary alkyl group of 5 to 20 carbon atoms and containing 2 to 4 secondary or higher carbon atoms which may be substituted), and the bromine atom-containing phthalocyanine compound is a compound represented by the general formula (3) (wherein at least one of X, Y and Z is a fluorine atom).

(22) An optical recording medium containing a phthalocyanine compound or composition set forth in any one of the (1) to (11) and the (14) to (21) above in a recording layer provided on a substrate.

(23) A postscript type optical recording medium adapted for a compact disc comprising a recording layer and a metallic reflecting layer provided on a transparent substrate of resin, wherein the recording layer is the recording layer set forth in the (22) above.

BEST MODE FOR CARRYING OUT THE INVENTION

The phthalocyanine compound according to this invention is a phthalocyanine compound of a structural formula of phthalocyanine represented by the general formula (1):

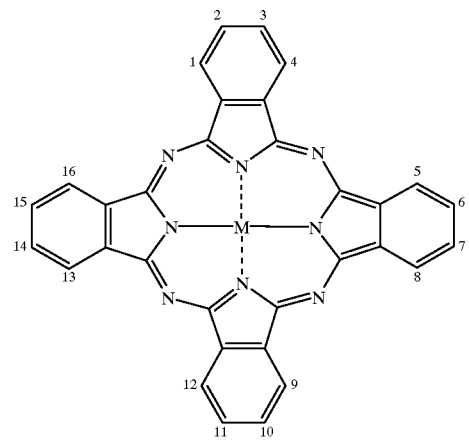

wherein 1 to 8 of a total 16 positions are substituted with a phenoxy group, one of the ortho positions of the phenoxy group being substituted with an aryl group which may be substituted, all the atoms in the aryl group and the substituent at the residual ortho position excluding the hydrogen atoms assume a total atomic radius of not less than 6.0 Å, and a central atom group M contains a metal atom of not less than trivalence.

For the phthalocyanine compound according to this invention, it is essential that one of the ortho positions of the phenoxy group being substituted with an aryl group which may be substituted, and that all the atoms in the aryl group and the substituent at the residual ortho position excluding the hydrogen atoms assume a total atomic radius of not less than 6.0 Å. {In this case, the following numerals (unit: Å) are used for the atomic radii of main atoms: carbon=0.77; oxygen=0.74; nitrogen=0.74; fluorine=0.72; chlorine=0.99; silicon=1.17; phosphorus=1.10; and sulfur=1.04.} The total atomic radius is preferred to be not less than 6.0 Å for the purpose of enabling the relevant phthalocyanine compound to manifest a practically significant solubility in a solvent.

As typical examples of the aryl group to be used in the phrase, "in the aryl group which may be substituted", a phenyl group, a naphthyl group, and the like may be cited. Preferably, the aryl group is a phenyl group. As typical examples of the substituent which is possibly present in the aryl group, halogen atoms, alkyl groups, alkoxy groups, halogenated alkyl groups, halogenated alkoxy groups, nitro groups, amino groups, alkylamino groups, and alkoxycarbonyl groups may be cited.

In the phthalocyanine compound according to this invention, a phenoxy group as the substituent is preferably substituted at any of the 2, 3, 6, 7, 10, 11, 14, and 15 positions of the general formula (1). In the case of the phthalocyanine compound having a central atom group containing a metal atom of not less than trivalence, such compounds as that the substituent is substituted at the above-mentioned position(s) may be preferably used because of the excellent adaptability of the optical properties to be manifested by the relevant compound when used in an optical recording medium.

In the phthalocyanine compound according to this invention, it is preferable that one of the ortho positions of the phenoxy group is substituted with the aryl group and at least other ortho position of the residual positions is substituted with at least one substituent selected among alkyl groups, aryl groups, alkoxy groups, aryloxy groups, alkoxycarbonyl groups, and aryloxycarbonyl groups.

The above-mentioned substituent may be, for example, at least one substituent selected from the group consisting of the substituents of the following (1) to (7) groups:

group (1) $R^1$
group (2) $CO_2R^2$
group (3) $CO_2(CH_2CH_2O)_aR^3$
group (4) $CO_2(CH_2CH_2CH_2O)_bR^4$
group (5) $O[(CH_2)_cO]_dR^5$
group (6) $CO_2(CH_2)_eR^6$

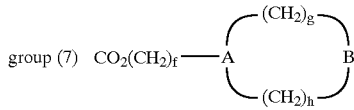

group (7) $CO_2(CH_2)_f$—A⟨(CH_2)_g / (CH_2)_h⟩B (wherein $R^1$ represents a linear, branched, or cyclic alkyl group of 1 to 20 carbon atoms which may be substituted or an aryl group which may be substituted, $R^2$, $R^3$, $R^4$, and $R^5$ independently represent a linear, branched, or cyclic alkyl group of 1 to 20 carbon atoms which may be substituted or an aryl group which may be substituted, $R^6$ represents an aryl group which may be substituted, A represents a CH group or a nitrogen atom, B represents an oxygen atom, a sulfur atom, a $CH_2$ group, an NH group, or an alkylamino group of 1 to 4 carbon atoms, a, b, c and e each represent an integer in the range of 1 to 5, d and f each represent an integer in the range of 0 to 6, and g and h independently represent an integer in the range of 1 to 4). Among other novel phthalocyanine compounds, those represented by the general formula (2) are preferably used. Now, these compounds will be described in detail.

In the general formula (2), M is a central atom group containing a metal of not less than trivalence. As typical examples of the central atom group of the phthalocyanine compound represented by M, iron chloride, aluminum chloride, indium chloride, germanium chloride, tin chloride, silicon chloride, titanyl, and vanadyl may be cited. Among other central atom groups cited above, tin chloride and vanadyl may be preferably used in terms of their excellent lightfastness, and vanadyl proves particularly advantageous because of its adaptability of optical properties when formed into an optical recording medium.

The substituent on the phenoxy group which is represented by W is an aryl group which may be substituted. As typical examples of the aryl group which may be substituted, a phenyl group, a naphthyl group, and the like may be cited. Particularly preferably, the aryl group is a phenyl group. As typical examples of the substituent which is possibly present in the aryl group, halogen atoms, alkyl groups, alkoxy groups, halogenated alkyl groups, halogenated alkoxy groups, nitro groups, amino groups, alkylamino groups, and alkoxycarbonyl groups may be cited.

The term "halogen atoms" as used herein refers to fluorine, chlorine, bromine, and iodine. Among other halogen atoms cited, bromine proves particularly advantageous.

The alkyl group is a linear, branched, or cyclic alkyl group of 1 to 20 carbon atoms which may be substituted, preferably an alkyl group of 1 to 8 carbon atoms,. As typical examples thereof, a methyl group, an ethyl group, a n-propyl group, an isopropyl group, a n-butyl group, a tert-butyl group, a n-pentyl group, a n-hexyl group, a cyclohexyl group, a n-octyl group, an 2-ethylhexyl group, a n-decyl group, a lauryl group, and a stearyl group may be cited.

The alkoxy group is a linear, branched, or cyclic alkoxy group of 1 to 20 carbon atoms, preferably an alkoxy group of 1 to 8 carbon atoms. As typical examples thereof, a methoxy group, an ethoxy group, a n-propyloxy group, an isopropyloxy group, a n-butoxy group, a tert-butoxy group, a n-pentyloxy group, a n-hexyloxy group, a cyclohexyloxy group, a n-octyloxy group, an 2-ethylhexyloxy group, and n-decyloxy group may be cited.

The halogenated alkyl group is a partially halogenated linear, branched, or cyclic alkyl group of 1 to 20 atoms, preferably a partially halogenated alkyl group of 1 to 8 carbon atoms. It is particularly preferred to be a partially brominated alkyl group of 1 to 8 carbon atoms. As typical examples of thereof, monobromoalkyl groups including a bromomethyl group, a bromoethyl group, a bromopropyl group, a bromobutyl group, a bromopentyl group, a bromohexyl group, a bromoheptyl group, and a bromooctyl group and dibromoalkyl groups including a 1,3-dibromopropyl group and a 1,3-dibromobutyl group may be cited.

The halogenated alkoxy group is a partially halogenated linear, branched, or cyclic alkoxy group of 1 to 20 carbon atoms, preferably a partially halogenated alkoxy group of 1 to 8 carbon atoms. It is particularly preferred to be a partially brominated alkoxy group of 1 to 8 carbon atoms. As typical examples of thereof, monobromoalkoxy groups including a bromomethoxy group, a bromoethoxy group, a bromopropoxy group, a bromobutoxy group, a bromopentoxy group, a bromohexyloxy group, a bromoheptyloxy group, and a bromooctyloxy group and dibromoalkoxy groups including a 1,3 -dibromopropoxy group and a 1,3-dibromobutoxy group may be cited.

The alkoxycarbonyl group refers to an alkoxycarbonyl of 1 to 8, preferably 1 to 5, carbon atoms optionally containing a hetero atom in the alkyl group portion of the alkoxy group thereof, or to a cyclic alkoxycarbonyl of 3 to 8, preferably 5 to 8, carbon atoms optionally containing a hetero atom. As typical examples of thereof, a methoxycarbonyl group, an ethoxycarbonyl group, a n-butoxycarbonyl group, a tert-butoxycarbonyl group, a n-pentyloxycarbonyl group, a n-hexyloxycarbonyl group, an 2-ethylhexyloxycarbonyl group, a methoxyethoxycarbonyl group, an ethoxyethoxycarbonyl group, a butoxyethoxycarbonyl group, a diethylaminoethoxycarbonyl group, a methylthioethoxycarbonyl group, a methoxypropyloxycarbonyl group, a (3,6,9-oxa)decyloxycarbonyl group, a tetrahydrofurfuryloxycarbonyl group, a pyranoxycarbonyl group, a piperidinoxycarbonyl group, a piperidinoethoxycarbonyl group, a tetrahydropyrroloxycarbonyl group, a tetrahydropyranmethoxycarbonyl group, a tetrahydrothiophenoxycarbonyl group, a cyclohexyloxycarbonyl group, and the like may be cited.

The substituent W on the phenoxy group must occur at the ortho position of the group. The occurrence of the optionally substituted aryl group at the ortho position of the phenoxy group is at an advantage in markedly repressing the absorption peak originating in the mass of association in the absorption spectrum of a thin film of the phthalocyanine compound (hereinafter referred to as "association peak") and sharpening the absorption peak originating in the monomer (hereinafter referred to as "monomer peak").

The substituent on the phenoxy group which is represented by V is at least one substituent selected from the group consisting of the substituents of the following (1) to (7) groups:

group (1) $R^1$
group (2) $CO_2R^2$
group (3) $CO_2(CH_2CH_2O)_aR^3$
group (4) $CO_2(CH_2CH_2CH_2O)_bR^4$ group (5) O[(CH$_2$)$_c$O]$_d$R$^5$
group (6) CO$_2$(CH$_2$)$_e$R$^6$

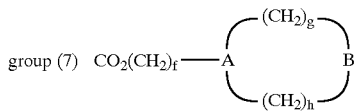

group (7) CO$_2$(CH$_2$)$_f$—A⟨(CH$_2$)$_g$ / (CH$_2$)$_h$⟩B (wherein R$^1$ represents a linear, branched, or cyclic alkyl group of 1 to 20 carbon atoms which may be substituted or an aryl group which may be substituted, R$^2$, R$^3$, R$^4$, and R$^5$ independently represent a linear, branched, or cyclic alkyl group of 1 to 20 carbon atoms which may be substituted or an aryl group which may be substituted, R$^6$ represents an aryl group which may be substituted, A represents a CH group or a nitrogen atom, B represents an oxygen atom, a sulfur atom, a CH$_2$ group, an NH group, or an alkylamino group of 1 to 4 carbon atoms, a, b, c and e each represent an integer in the range of 1 to 5, d and f each represent an integer in the range of 0 to 6, and g and h independently represent an integer in the range of 1 to 4). As typical examples of these substituents, the following groups of substituents may be cited.

Group (1): Methyl, ethyl, propyl, isopropyl, cyclopropyl, butyl, isobutyl, sec-butyl, tert-butyl, linear or branched pentyl, linear or branched hexyl, cyclohexyl, linear or branched heptyl, linear or branched octyl, linear or branched nonyl, linear or branched decyl, linear or branched undecyl, linear or branched dodecyl, phenyl, o-methylphenyl, m-methylphenyl, p-methylphenyl, o-ethylphenyl, m-ethylphenyl, p-ethylphenyl, o-propylphenyl, m-propylphenyl, p-propylphenyl, o-isopropylphenyl, m-isopropylphenyl, p-isopropylphenyl, o-butylphenyl, m-butyl-phenyl, p-butylphenyl, o-tert-butylphenyl, m-tert-butylphenyl, p-tert-butylphenyl, o-methoxyphenyl, m-methoxyphenyl, p-methoxyphenyl, o-ethoxyphenyl, m-ethoxyphenyl, p-ethoxyphenyl, o-propoxyphenyl, m-propoxyphenyl, p-propoxyphenyl, o-isopropoxyphenyl, m-isopropoxyphenyl, p-isopropoxyphenyl, o-butoxyphenyl, m-butoxyphenyl, p-butoxyphenyl, 2,6-dimethylphenyl, 2,6-diethylphenyl, 2,6-dipropylphenyl, 2-6-diisopropylphenyl, 2,6-dibutylphenyl, 2,6-di-tert-butylphenyl, 2,6-dimethoxyphenyl, 2,6-diethoxyphenyl, 2,6-dipropoxyphenyl, 2,6-diisopropoxyphenyl, 2,6-dibutoxyphenyl, 2-fluorophenyl, 2-chlorophenyl, 2-bromophenyl, 2-iodophenyl, 3-fluorophenyl, 3-chlorophenyl, 3-bromophenyl, 3-iodophenyl, 4-fluorophenyl, 4-chlorophenyl, 4-bromophenyl, 4-iodophenyl, 2,3-difluorophenyl, 2,3-dichlorophenyl, 2,4-difluorophenyl, 2,4-dichlorophenyl, 2,4-dibromophenyl, 2,5-difluorophenyl, 2,5-dichlorophenyl, 2,6-difluorophenyl, 2,6-dichlorophenyl, 2,6-dibromophenyl, 3,4-difluorophenyl, 3,4-dichlorophenyl, 3,5-difluorophenyl, 3,5-dichlorophenyl, 2,3,4-trifluorophenyl, 2,3,4-trichlorophenyl, 2,3,5-trifluorophenyl, 2,3,5-trichlorophenyl, 2,3,6-trifluorophenyl, 2,3,6-trichlorophenyl, 2,4,6-trifluorophenyl, 2,4,6-trichlorophenyl, 2,4,6-tribromophenyl, 2,4,6-triiodophenyl, 2,3,5,6-tetrafluorophenyl, pentafluorophenyl, pentachlorophenyl, bornyl, 1-adamantyl, 2-adamantyl, 1-methyl adamantyl, and fenchyl.

Group (2): Methoxycarbonyl, ethoxycarbonyl, propoxycarbonyl, isopropoxycarbonyl, butoxycarbonyl, isobutoxycarbonyl, sec-butoxycarbonyl, tert-butoxycarbonyl, linear or branched pentyloxycarbonyl, linear or branched hexyloxycarbonyl, cyclohexylcarbonyl, linear or branched heptyloxycarbonyl, linear or branched octyloxycarbonyl, linear or branched nonyloxycarbonyl, linear or branched decyloxycarbonyl, linear or branched undecyloxycarbonyl, linear or branched dodecyloxycarbonyl, cyclohexane methoxycarbonyl, cyclohexane ethoxycarbonyl, 3-cyclohexyl-1-propoxycarbonyl, tert-butylcyclohexyloxycarbonyl, phenoxycarbonyl, 4-methylphenoxycarbonyl, 4-chlorophenoxycarbonyl, 4-cyclohexylphenoxycarbonyl, 4-phenylphenoxycarbonyl, 2-fluorophenoxycarbonyl, and 4-ethoxyphenoxycarbonyl.

Group (3): Methoxyethoxycarbonyl, ethoxyethoxycarbonyl, 3',6'-oxaheptyloxycarbonyl, 3',6'-oxaoctyloxycarbonyl, 3',6',9'-oxadecyloxycarbonyl, 3',6',9',12'-oxatridecyloxydicarbonyl, borneoxycarbonyl, 1-adamantanoxycarbonyl, 2-adamantanoxycarbonyl, 1-methyl adamantanoxycarbonyl, and fenchyloxycarbonyl.

Group (4): Methoxypropyloxycarbonyl, ethoxypropyloxycarbonyl, 4',8'-oxanonyloxycarbonyl, 4',8'-oxadecyloxycarbonyl, and 4',8',12'-oxatridecyloxycarbonyl.

Group (5): Methoxy, ethoxy, propoxy, isopropoxy, butoxy, isobutoxy, sec-butoxy, tert-butoxy, linear or branched pentyloxy, linear or branched hexyloxy, cyclohexyloxy, linear or branched heptyloxy, linear or branched octyloxy, linear or branched nonyloxy, linear or branched decyloxy, linear or branched undecyloxy, linear or branched dodecyloxy, methoxyethoxy, ethoxyethoxy, 3',6'-oxaheptyloxy, 3',6'-oxaoctyloxy, 3',6',9'-oxadecyloxy, 3',6',9',12'-oxatridecyloxy, methoxypropyloxy, ethoxypropyloxy, 4',8'-oxanonyloxy, 4',8'-oxadecyloxy, borneoxy, 1-adamantanoxy, 2-adamantanoxy, 1-methyl adamantanoxy, and fenchyloxy.

Group (6): Benzyloxycarbonyl, phenethyloxycarbonyl, 3-phenyl-1-propoxycarbonyl, 4-phenyl-1-butoxycarbonyl, 5-phenyl-1-pentoxycarbonyl, and 6-phenyl-1-hexyloxycarbonyl.

Group (7): 2-Tetrahydroxyfuranoxycarbonyl, 4-tetrahydropyranoxycarbonyl, 2-pyrrolidinoxycarbonyl, 2-piperidinoxycarbonyl, 2-tetrahydrothiophenoxycarbonyl, tetrahydrofurfuryloxycarbonyl, 4-tetrahydropyranoxycarbonyl, 2-morpholinoethoxycarbonyl, 2-pyrrolidinoethoxycarbonyl, and 2-piperadinoethoxycarbonyl.

Among other substituents of the groups (1) to (7) enumerated above, those of the group (2) prove favorable. Such alkoxycarbonyl groups as isopropoxycarbonyl and tert-butoxycarbonyl which have secondary or tertiary alkyl groups directly linked to the carbonyl group prove particularly advantageous. R$^2$ in the substituent represented by the group (2) may be contain a substituent. R$^2$ is preferably a secondary or tertiary alkyl group of 5 to 20, preferably 6 to 15, more preferably 6 to 10 carbon atoms and containing 2 to 4 secondary or higher carbon atoms. As typical examples of R$^2$ contained in the substituent CO$_2$R$^2$ represented by the group (2), 3-methyl-2-butyl group, 2,3-dimethyl-2-butyl group, 3,3-dimethyl-2-butyl group, 2-methyl-3-pentyl group, 3-methyl-2-pentyl group, 4-methyl-2-pentyl group, 2,2-dimethyl-3-pentyl group, 2,3-dimethyl-3-pentyl group, 2,4-dimethyl-3-pentyl group, 4,4-dimethyl-2-pentyl group, 2-methyl-3-hexyl group, 5-methyl-2-hexyl group, 2,3,3-trimethyl-2-butyl group, 3,4-dimethyl-2-pentyl group, 2,3-dimethyl-2-pentyl group, 3,3-dimethyl-2-pentyl group, 3-ethyl-2-pentyl group, 4-methyl-3-hexyl group, 3-methyl-2-hexyl group, 2,2-dimethyl-3-hexyl group, 2,3-dimethyl-2-hexyl group, 2,5-dimethyl-2-hexyl group, 3,4-dimethyl-3-hexyl group, 3,5-dimethyl-3-hexyl group, 3-ethyl-2-methyl-3-pentyl group, 4-methyl-3-heptyl group, 5-methyl-2-heptyl group, 5-methyl-3-heptyl group, 6-methyl-2-heptyl group, 6-methyl-3-heptyl group, 2,3,4-trimethyl-2-pentyl group, 2,3,4-trimethyl-3-pentyl group, 2-methyl-3-ethyl-2-pentyl group, 3-ethyl-3-methyl-2-pentyl group, 3-ethyl-4-methyl-2-pentyl group, 2-ethyl-3-methyl-2-pentyl group, 2,3-dimethyl-3-hexyl group, 2,4-dimethyl-3-hexyl group, 4,5-dimethyl-3-hexyl group, 4-ethyl-3-hexyl group, 3-ethyl-2-hexyl group, 3,4-dimethyl-2-hexyl group, 3,5-dimethyl-2-hexyl group, 2-methyl-3-heptyl group, 3-methyl-2-heptyl group, 3-methyl-4-heptyl group, 2,6-dimethyl-4-heptyl group, 3-ethyl-2,2-dimethyl-3-pentyl group, 2-methyl-3-octyl group, 3,5-dimethyl-4-heptyl group, 2,4-dimethyl-3-ethyl-3-pentyl group, 2,3-dimethyl-4-heptyl group, 4-ethyl-2-methyl-3-hexyl group, 2,4,5-trimethyl-3-hexyl group, 3,4,5-trimethyl-2-hexyl group, 3-ethyl-4-methyl-2-hexyl group, 4-ethyl-3-methyl-2-hexyl group, 2,3-dimethyl-4-heptyl group, 3,7-dimethyl-3-octyl group, 3,7-dimethyl-4-octyl group, 2,6-dimethyl-3-octyl group, 2-methyl-3-undecyl group, 7-ethyl-2-methyl-4-undecyl group, 2-methyl-3-tridecyl group, and 2-methyl-4-tridecyl group may be cited. Among other alkyl groups cited above, alkyl groups having 2 or more secondary or higher carbon atoms adjacent, particularly alkyl groups having 3 or more secondary or higher carbon atoms adjacent prove preferable. As typical examples thereof, 2,4-dimethyl-3-pentyl group, 3,4-dimethyl-2-pentyl group, 2,3,4-trimethyl-2-pentyl group, 2,3,4-trimethyl-3-pentyl group, 3-ethyl-4-methyl-2-pentyl group, 2,4-dimethyl-3-hexyl group, 4,5-dimethyl-3-hexyl group, 3,4-dimethyl-2-hexyl group, 3,5-dimethyl-4-heptyl group, 2,4-dimethyl-3-ethyl-3-pentyl group, 2,3-dimethyl-4-heptyl group, 4-ethyl-2-methyl-3-hexyl group, 2,4,5-trimethyl-3-hexyl group, 3,4,5-trimethyl-2-hexyl group, 3-ethyl-4-methyl-2-hexyl group, 4-ethyl-3-methyl-2-hexyl group, and 2,3-dimethyl-4-heptyl group may be cited. By using a phthalocyanine compound which has as the substituent an alkoxycarbonyl group having secondary or higher alkyl groups directly linked to the carbonyl group, and further by incorporating 2 to 4 secondary or higher carbon atoms into the alkyl group, the phthalocyanine compound has large degrees of weight loss per unit time after the start of thermal decomposition, as determined by the thermogravimetry. This means that the phthalocyanine compound changes in more rapid response to heat. Consequently, this phthalocyanine compound is advantageous in respect that it, when used in an optical recording medium, manifests outstanding effects in such optical properties as reflectance and recording sensitivity, particularly in the recording sensitivity. The substituents which may be present depending on the above-identified $R^2$ may be a halogen atom, an alkoxy group or a nitro group, for example.

Though the position which the substituent V occupies on the phenoxy group is not critical, this substituent V is preferred to be present at the ortho position of the phenoxy group. It is particularly advantageous that V and W be both present at the ortho positions, i.e. 2 and 6 positions, of the phenoxy group. Owing to the presence of V and W at the 2 and 6 positions of the phenoxy group, the association peak in the absorption spectrum of a thin film of the phthalocyanine compound is markedly repressed and the monomer peak is sharpened. The phthalocyanine compound under discussion proves advantageous in respect that this compound, when used in an optical recording medium, excels in such optical properties as reflectance and recording sensitivity.

Particularly favorably, V and W occupy the 2 and 6 positions of the phenoxy group and V is an alkoxycarbonyl group having a secondary or higher alkyl group directly linked to the carbonyl group. Further, 2 to 4 secondary or higher carbon atoms is incorporated in the alkyl group. These conditions enable the phthalocyanine compound to excel in such optical properties as reflectance and recording sensitivity when used in an optical recording medium.

To the positions of the phenoxy group which remain after the introduction of the substituents V and W mentioned above, new substituents may be introduced for the purpose of enhancing the solubility or allowing control of the absorption wavelength. As typical examples of the substituent to be used for this introduction, halogen atoms, alkoxycarbonyls the alkoxy group of which is a linear or branched alkoxy of 1 to 20 carbon atoms which may be substituted, aryloxycarbonyl groups which may be substituted, linear or branched alkyl groups of 1 to 12 carbon atoms which may be substituted, linear or branched alkoxy groups of 1 to 12 carbon atoms, linear or branched monoalkylamino groups of 1 to 20 carbon atoms, linear or branched dialkylamino groups of 1 to 20 carbon atoms, cyclohexyl groups, phenoxy groups which may be substituted, and anilino groups or nitro groups which may be substituted may be cited.

Among other substituents cited above, halogen atoms prove favorable and bromine atom proves particularly advantageous.

X, Y, and Z each represent a hydrogen atom or a halogen atom. At least one of X, Y, and Z is a fluorine atom. X, Y, and Z are preferred to be invariably a fluorine atom in respect that the phthalocyanine compound fulfilling this condition excels in solubility.

Further, provided that V and W occupy the 2 and 6 positions of the phenoxy group, V is an alkoxycarbonyl group having a secondary or higher alkyl group directly linked to the carbonyl group, and X, Y, and Z are invariably a fluorine atom, the phthalocyanine compound would excel in solubility and thus in a film-forming properties. Such a phthalocyanine compound, when used in an optical recording medium, excels particularly in such optical properties as reflectance and recording sensitivity. It proves particularly favorable in respect that it possesses properties adaptable for a high-speed recording type compact disc.

As the phthalocyanine compound to be used in the present invention, the following compounds may be cited, for example.

Compound 1: Tetrakis(2-phenyl-6-isopropylphenoxy) dodecafluoro chloroaluminum phthalocyanine;

Compound 2: Tetrakis(2,6-diphenylphenoxy) dodecafluoro vanadyl phthalocyanine;

Compound 3: Tetrakis(2,4-diphenylphenoxy) dodecafluoro titanyl phthalocyanine;

Compound 4: Tetrakis(2,4,6-triphenylphenoxy) dodecafluoro vanadyl phthalocyanine;

Compound 5: Tetrakis(2-isopropoxycarbonyl-6-phenylphenoxy) dodecafluoro vanadyl phthalocyanine;

Compound 6: Tetrakis(2-(3-pentoxy)carbonyl-6-phenylphenoxy) dodecafluoro vanadyl phthalocyanine;

Compound 7: Tetrakis(2-(3-pentoxy)carbonyl-4-phenylphenoxy) dodecafluoro chloroindium phthalocyanine;

Compound 8: Tetrakis (2-tert-butoxycarbonyl-6-phenylphenoxy) dodecafluoro vanadyl phthalocyanine;

Compound 9: Tetrakis (2,4-diisopropoxycarbonyl-6-phenylphenoxy) dodecafluoro titanyl phthalocyanine;

Compound 10: Tetrakis(2-(2-butoxy)carbonyl-6-phenylphenoxy) dodecafluoro vanadyl phthalocyanine;

Compound 11: Tetrakis(2-(2-pentoxy)carbonyl-6-phenylphenoxy) dodecafluoro vanadyl phthalocyanine;

Compound 12: Tetrakis(2-(3-methoxypropoxy)carbonyl-6-phenylphenoxy)dodecafluoro vanadyl phthalocyanine;

Compound 13: Tetrakis(2,4-di(2-methoxyethoxy) carbonyl-6-phenylphenoxy)dodecafluoro titanyl phthalocyanine;

Compound 14: Tetrakis(2-ethoxy-6-phenylphenoxy) dodecafluoro vanadyl phthalocyanine;

Compound 15: Tetrakis (2,4-diethoxy-6-phenylphenoxy) dodecafluoro vanadyl phthalocyanine;

Compound 16: Tetrakis(2-benzyloxycarbonyl-6-phenylphenoxy) dodecafluoro titanyl phthalocyanine;

Compound 17: Tetrakis(2-phenetyloxycarbonyl-6-phenylphenoxy) dodecafluoro chloroaluminum phthalocyanine;

Compound 18: Tetrakis(2-(2-tetrahydrofurfuryloxy) carbonyl-6-phenylphenoxy)dodecafluoro (dichloro tin) phthalocyanine;

Compound 19: Tetrakis(4-(2-tetrahydrofurfuryloxy) carbonyl-6-phenylphenoxy)dodecafluoro (dichloro tin) phthalocyanine;

Compound 20: Tetrakis(2,4-di(2-tetrahydrofurfuryloxy) carbonyl-6-phenylphenoxy)dodecafluoro chloroindium phthalocyanine;

Compound 21: Tetrakis(6-(bromophenyl)-2-isopropoxycarbonyl phenoxy)dodecafluoro vanadyl phthalocyanine;

Compound 22: Tetrakis(bromo-2-isopropoxycarbonyl-6-phenylphenoxy)dodecafluoro vanadyl phthalocyanine;

Compound 23: Tetrakis(6-(4-chlorophenyl)-2-isopropoxy-carbonylphenoxy)dodecafluoro titanyl phthalocyanine;

Compound 24: Tetrakis(4-fluoro-2-(2-methoxyethoxy) carbonyl-6-phenylphenoxy)dodecafluoro vanadyl phthalocyanine;

Compound 25: Tetrakis(6-(4-bromomethylphenyl)-2-(2-tetra-hydrofurfuryloxy)carbonylphenoxy)dodecafluoro titanyl phthalocyanine;

Compound 26: Tetrakis(6-(4-bromomethoxyphenyl)-2-isopropoxy carbonylphenoxy)dodecafluoro vanadyl phthalocyanine;

Compound 27: Bis(2-isopropoxycarbonyl-6-phenylphenoxy) tetradecafluoro vanadyl phthalocyanine;

Compound 28: Bis(2-(2-methoxyethoxy)carbonyl-6-phenylphenoxy) tetradecafluoro titanyl phthalocyanine;

Compound 29: Octakis(2-isopropoxycarbonyl-6-phenylphenoxy) octafluoro vanadyl phthalocyanine;

Compound 30: Octakis(2-tert-butoxycarbonyl-6-phenylphenoxy) octafluoro vanadyl phthalocyanine.

As the phthalocyanine compound according to this invention, a phthalocyanine compound wherein in the general formula (2), X, Y, and Z are invariably a fluorine atom, V is a substituent of the (2) group represented by $CO_2R^2$, M is a metal, a metal oxide or a metal chloride selected among aluminum chloride, indium chloride, tin dichloride, silicon dichloride, titanyl, and vanadyl, and W is an aryl group which may be substituted may be preferably used. More preferably, a phthalocyanine compound wherein $R^2$ is an alkyl group of 6 to 10 carbon atoms and having secondary or higher carbon atoms adjacent, M is vanadyl, and W is a phenyl group which may be substituted may be used. As typical examples of such a phthalocyanine compound, the following compounds may be cited.

Compound 31: Tetrakis(2-(2,3-dimethyl-2-butoxy) carbonyl-6-(4-bromo)phenylphenoxy)dodecafluoro vanadyl phthalocyanine;

Compound 32: Tetrakis(2-(3,3-dimethyl-2-butoxy) carbonyl-6-phenylphenoxy)dodecafluoro vanadyl phthalocyanine;

Compound 33: Tetrakis(2-(2,2-dimethyl-3-pentyloxy) carbonyl-6-phenylphenoxy)dodecafluoro vanadyl phthalocyanine;

Compound 34: Tetrakis(2-(2,3-dimethyl-3-pentyloxy) carbonyl-6-phenylphenoxy)dodecafluoro vanadyl phthalocyanine;

Compound 35: Tetrakis(2-(2,4-dimethyl-3-pentyloxy) carbonyl-6-phenylphenoxy)dodecafluoro vanadyl phthalocyanine;

Compound 36: Tetrakis(2-(2,2-dimethyl-3-hexyloxy) carbonyl-6-phenylphenoxy)dodecafluoro vanadyl phthalocyanine;

Compound 37: Tetrakis(2-(2,3-dimethyl-2-hexyloxy) carbonyl-6-phenylphenoxy)dodecafluoro vanadyl phthalocyanine;

Compound 38: Tetrakis(2-(2,5-dimethyl-3-hexyloxy) carbonyl-6-phenylphenoxy)dodecafluoro vanadyl phthalocyanine;

Compound 39: Tetrakis(2-(3,4-dimethyl-3-hexyloxy) carbonyl-6-phenylphenoxy)dodecafluoro vanadyl phthalocyanine;

Compound 40: Tetrakis(2-(3-ethyl-2-methyl-3-pentyloxy) carbonyl-6-phenylphenoxy)dodecafluoro vanadyl phthalocyanine;

Compound 41: Tetrakis(2-(4-methyl-3-heptyloxy) carbonyl-6-phenylphenoxy)dodecafluoro vanadyl phthalocyanine;

Compound 42: Tetrakis(2-(3-ethyl-2,2-dimethyl-3-pentyloxy) carboxyl-6-phenylphenoxy)dodecafluoro vanadyl phthalocyanine;

Compound 43: Tetrakis(2-(3,7-dimethyl-3-octyloxy) carbonyl-6-phenylphenoxy)dodecafluoro vanadyl phthalocyanine;

Compound 44: Tetrakis(2-(7-ethyl-2-methyl-4-undecyloxy)-carbonyl-6-phenylphenoxy)dodecafluoro vanadyl phthalocyanine;

Compound 45: Tetrakis(2-(borneoxycarbonyl-6-phenylphenoxy) dodecafluoro vanadyl phthalocyanine;

Compound 46: Tetrakis(2-(l-adamantanoxycarbonyl-6-phenylphenoxy)dodecafluoro vanadyl phthalocyanine.

As described above, the novel phthalocyanine compounds according to this invention exhibit excellent solubility, form only a small association peak in the absorption spectrum of a thin film, produce a sharp monomer peak, and excel in lightfastness. The phthalocyanine compound of this invention, when used in an optical recording medium, can manifest excellent reflectance. The novel phthalocyanine compounds according to this invention can also manifest excellent heat-decomposition properties. To be specific, they are found to have large degrees of weight loss per unit time immediately after the start of thermal decomposition as determined by the use of a thermogravimetric analyzer. This means that the phthalocyanine compound changes in more rapid response to heat. As a result, they excel in recording sensitivity when used in an optical recording medium. They, therefore, can manifest outstanding effects when used in a transparent substrate of resin which necessitate such properties as reflectance and sensitivity in particular and in postscript type optical recording media adapted for compact discs and formed of a recording layer and a metallic reflecting layer provided on the substrate (such as, for example, postscript type optical recording media which afford compatibility and shareability for the players of audio CD's for the regeneration of music, PHOTO-CD's for the conservation of photographs, and CD-ROM's for the operation of computers).

This invention also concerns a phthalocyanine compound of a structural formula of phthalocyanine represented by the general formula (1):

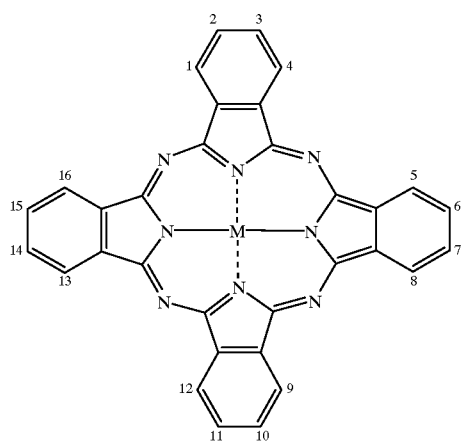

(1)

wherein 1 to 8 of a total 16 positions are substituted with a phenoxy group, one of the ortho positions of the phenoxy group being substituted with an aryl group which may be substituted while the other ortho position being substituted with a bromine atom-containing substituent, and all the atoms in the aryl group and the substituent at the residual ortho position excluding the hydrogen atoms assume a total atomic radius of not less than 6.0 Å.

As typical examples of the compounds of this class, such phthalocyanine compounds as are represented by the general formula (3):

represents an integer in the range of 0 to 3, W represents an aryl group which may be substituted, V represents at least one substituent selected among bromine-substituted residues of the substituents of the following (1) to (3) groups:

group (1) $R^7$
group (2) $CO_2R^8$
group (3) $O[(CH_2)_cO]_dR^9$ (wherein $R^7$, $R^8$, and $R^9$ independently represent a linear, branched, or cyclic alkyl group of 1 to 20 carbon atoms which may be substituted or an aryl group which may be substituted, c represents an integer in the range of 1 to 5, and d represents an integer in the range of 0 to 6) where a, b, c, and d each represent an integer in the range of 1 to 3 or at least one substituent selected among the substituents of (1) to (3) groups mentioned above where a, b, c, and d each represent 0, and M represents a metal, a metal oxide, or a halogenated metal] may be cited.

In the general formula (3), the substituent W is the same as that in the general formula (2) and, as respects V, $R^7$ of the group (1) is identical with $R^1$ of the group (1) in the general formula (2) excepting it contains a bromine atom, the $CO_2R^8$ of the group (2) is identical with the $CO_2R^2$ of the group (2) in the general formula (2), and the $O[(CH_2)_c]_dR^9$ of the group (3) is identical with the $O[(CH_2)_c]_dR^5$ of the group (5) in the general formula (2).

The substituted or unsubstituted aryl group which is contained in the phthalocyanine compound of this invention is preferred to be present at the ortho position of the phenoxy group. The fact that the aryl group which may be substituted is present at the ortho position of the phenoxy group proves favorable in respect that the absorption peak originating in the mass of association in the absorption spectrum of a thin

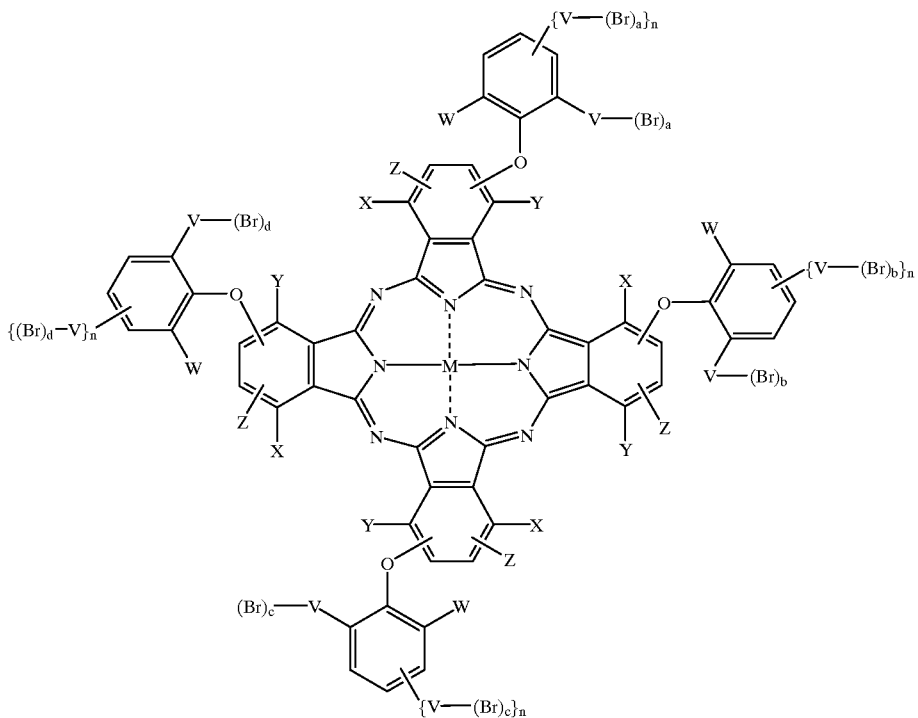

(3)

[wherein X, Y, and Z each represent a hydrogen atom or a halogen atom, a, b, c, and d each represent an integer in the range of 0 to 3, the total number of bromine atoms involved in the substitution is an integer in the range of 2 to 12, n film of the relevant phthalocyanine compound (hereinafter referred to as "association peak") is markedly repressed and the absorption peak originating in the monomer (hereinafter referred to as "monomer peak") is sharpened.

The other substituent which is used for the substitution at the residual ortho position of the phenoxy groups is a bromine atom-containing substituent, i.e. a substituent which results from the substitution of part or all the hydrogen atoms of a substituent having a linear, branched, or cyclic alkyl chain of 1 to 20 carbon atoms with bromine atoms. The alkyl chain mentioned above is preferred to be an alkyl chain of 1 to 8 carbon atoms. As typical examples thereof, such alkyl chains as of methyl, ethyl, n-propyl, isopropyl, n-butyl, tert-butyl, n-pentyl, n-hexyl, cyclohexyl, n-octyl, 2-ethylhexyl, n-decyl, lauryl, stearyl, methoxyethyl, ethoxyethyl, 3',6'-oxaheptyl, 3',6'-oxaoctyl, 3',6',9'-oxadecyl, and 3',6',9',12'-oxatridecyl may be cited.

According to the present invention, the bromine atom-containing substituent is present at the ortho position of the phenoxy group. The fact that the bromine atom-containing substituent is present at the ortho position of the phenoxy group proves favorable in respect that it notably represses the absorption peak originating in the mass of association in the absorption spectrum of a thin film of the relevant phthalocyanine compound (hereinafter referred to as "association peak") and sharpens the absorption peak originating in the monomer (hereinafter referred to as "monomer peak").

In this invention, the number of bromine atoms in the bromine atom-containing substituent is preferably in the range of 1 to 3. The total number of bromine atoms contained in the phthalocyanine compound of this invention is preferred to be in the range of 2 to 12.

The W in the general formula (3) is the same as that in the general formula (2). The M is a metal, a metal oxide, or a halogenated metal. As typical examples of the central metal of the phthalocyanine compound represented by M, iron chloride, magnesium, nickel, cobalt, copper, palladium, zinc, aluminum chloride, indium chloride, germanium chloride, tin chloride, silicon chloride, titanyl, and vanadyl may be cited. Among other central metals cited above, an atom group containing a metal of not less than trivalence such as aluminum chloride, indium chloride, germanium chloride, tin chloride, silicon chloride, titanyl, and vanadyl prove preferable. Especially, vanadyl proves excellent in the respect of the adaptability of the optical properties to be manifested by the relevant compound when used in an optical recording medium.

The substituent on the phenoxy group represented as V—(Br)$_{a(b,c,d)}$ represents a bromine atom-containing substituent where a, b, c, and d each represent an integer in the range of 1 to 3. In this case, V is at least one member selected from the class of bromine-substituted residues of the substituents possessing alkyl chains of the following (1) to (3) groups:

group (1) $R^7$
group (2) $CO_2R^8$
group (3) $O[(CH_2)_cO]_dR^9$ (wherein $R^7$, $R^8$, and $R^9$ independently represent a linear, branched, or cyclic alkyl group of 1 to 20 carbon atoms which may be substituted or an aryl group which may be substituted, c represents an integer in the range of 1 to 5, and d represents an integer in the range of 0 to 6). As typical examples of the bromine atom-containing substituent, the following substituents of the following groups (4) to (6) may be cited.

Group (4): Bromomethyl, dibromomethyl, tribromomethyl, 1-bromoethyl, 2-bromoethyl, 1,2-dibromoethyl, 1,1-dibromoethyl, 2,2-dibromoethyl, 1,1,2-tribromoethyl, 1,2,2-tribromoethyl, 1-bromopropyl, 2-bromo-1-propyl, 3-bromo-1-propyl, 1-bromo-2-propyl, 2,3-dibromo-1-propyl, 2,3-dibromo-2-propyl, 4-bromo-1-butyl, 1-bromo-1-butyl, 1-bromo-2-butyl, 2-bromo-1-butyl, 1,4-dibromo-2-butyl, 5-bromo-1-pentyl, 1-bromo-1-pentyl, 6-bromo-1-hexyl, 1-bromo-1-hexyl, 7-bromo-1-heptyl, 1-bromo-1-heptyl, 8-bromo-1-octyl, 1-bromo-1-octyl, 9-bromo-1-nonyl, 1-bromo-1-nonyl, 10-bromo-1-decyl, 1-bromo-1-decyl, 11-bromo-1-undecyl, 1-bromo-1-undecyl, 12-bromo-1-dodecyl, and 1-bromo-1-dodecyl.

Group (5): Bromomethoxycarbonyl, 2-bromoethoxycarbonyl, 3-bromo-1-propoxycarbonyl, 2-bromo-1-propoxycarbonyl, 1-bromo-2-propoxycarbonyl, 2,3-dibromo-1-propoxycarbonyl, 1,3-dibromo-2-propoxycarbonyl, 1-bromo-2-butoxycarbonyl, 2-bromo-1-butoxycarbonyl, 4-bromo-1-butoxycarbonyl, 1,4-dibromo-2-butoxycarbonyl, 5-bromo-1-pentyloxycarbonyl, 6-bromo-1-hexyloxycarbonyl, 7-bromo-1-heptyloxycarbonyl, 8-bromo-1-octyloxycarbonyl, 9-bromo-1-nonyloxycarbonyl, 10-bromo-1-decyloxycarbonyl, 11-bromo-1-undecyloxycarbonyl, and 12-bromo-1-dodecyloxycarbonyl.

Group (6): Bromomethoxy, dibromomethoxy, tribromomethoxy, 1-bromoethoxy, 2-bromoethoxy, 1,2-dibromoethoxy, 1,1,-dibromoethoxy, 2,2-dibromoethoxy, 1,1,2-tribromoethoxy, 1,2,2-tribromoethoxy, 1-bromopropoxy, 2-bromo-1-propoxy, 3-bromo-1-propoxy, 1-bromo-2-propoxy, 2,3-dibromo-1-propoxy, 1,3-dibromo-2-propoxy, 4-bromo-1-butoxy, 1-bromo-1-butoxy, 1-bromo-2-butoxy, 2-bromo-1-butoxy, 1,4-dibromo-2-butoxy, 5-bromo-1-pentyloxy, 1-bromo-1-pentyloxy, 6-bromo-1-hexyloxy, 1-bromo-1-hexyloxy, 7-bromo-1-heptyloxy, 1-bromo-1-heptyloxy, 8-bromo-1-octyloxy, 1-bromo-1-octyloxy, 9-bromo-1-nonyloxy, 1-bromo-1-nonyloxy, 10-bromo-1-decyloxy, 1-bromo-1-decyloxy, 11-bromo-1-undecyloxy, 1-bromo-1-undecyloxy, 12-bromo-1-dodecyloxy, 1-bromo-1-dodecyloxy, bromomethoxyethoxy, 1-bromoethoxyethoxy, 1-bromo-3',6'-oxaheptyloxy, 1-bromo-3',6'-oxaoctyloxy, 1-bromo-3',6',9'-oxadecyloxy, 1-bromo-3',6',9',12'-oxatridecyloxy, bromomethoxypropoxy, 1-bromoethoxypropoxy, 1-bromo-4',8'-oxanonyloxy, and 1-bromo-4',8'-oxadecyloxy.

In the present invention, the substituents of the group (5) are preferable among all the substituents of the groups (4) to (6) as mentioned above. Such alkoxycarbonyl groups as 1-bromo-2-propoxycarbonyl and 1,3-dibromo-2-propoxycarbonyl which possess a brominated secondary or higher alkyl group prove particularly advantageous. The phthalocyanine compound which has as the substituent such an alkoxycarbonyl group as contains a brominated secondary or higher alkyl group proves advantageous in respect that this compound, when used in an optical recording medium, excels in such optical properties as reflectance and recording sensitivity, particularly in recording sensitivity.

This invention allows the use of such a substituent as contains bromine atoms at the ortho position and, when necessary, at the meta position and the para position of the phenoxy group. In this case, the substituent V in the general formula (1) mentioned above does not need to be invariably identical on the phthalocyanine skeleton but may be one member selected from the class of bromine-substituted residues of the substituents possessing alkyl chains of the groups (1) to (3) as mentioned above.

In the substituent on the phenoxy group which is represented as V—(Br)$_{a(b,c,d)}$, V is at least one member selected from the class of substituents possessing alkyl chains of the groups (1) to (3) mentioned above where a, b, c, and d each are 0. As typical examples of this substituent V, the following groups may be cited.

Group (1): Methyl, ethyl, propyl, isopropyl, cyclopropyl, butyl, isobutyl, sec-butyl, tert-butyl, linear or branched pentyl, linear or branched hexyl, cyclohexyl, linear or branched heptyl, linear or branched octyl, linear or branched nonyl, linear or branched decyl, linear or branched undecyl, and linear or branched dodecyl.

Group (2): Methoxycarbonyl, ethoxycarbonyl, propoxycarbonyl, isopropoxycarbonyl, butoxycarbonyl, isobutoxycarbonyl, sec-butoxycarbonyl, tert-butoxycarbonyl, linear or branched pentyloxycarbonyl, linear or branched hexyloxycarbonyl, cyclohexyloxycarbonyl, linear or branched heptyloxycarbonyl, linear or branched octyloxycarbonyl, linear or branched nonyloxycarbonyl, linear or branched decyloxycarbonyl, linear or branched undecyloxycarbonyl, linear or branched dodecyloxycarbonyl, cyclohexane methoxycarbonyl, cyclohexane ethoxycarbonyl, 3-cyclohexyl-1-propoxycarbonyl, and tert-butylcyclohexyloxycarbonyl.

Group (3): Methoxy, ethoxy, propoxy, isopropoxy, butoxy, isobutoxy, sec-butoxy, tert-butoxy, linear or branched pentyloxy, linear or branched hexyloxy, cyclohexyloxy, linear or branched heptyloxy, linear or branched octyloxy, linear or branched nonyloxy, linear or branched decyloxy, linear or branched undecyloxy, linear or branched dodecyloxy, methoxyethoxy, ethoxyethoxy, 3',6'-oxaheptyloxy, 3',6'-oxaoctyloxy, 3',6',9'-oxadecyloxy, 3',6',9',12'-oxatridecyloxy, methoxypropyloxy, ethoxypropyloxy, 4',8'-oxanonyloxy, and 4',8'-oxadecyloxy.

To the positions of the phenoxy group which remain after the introduction of the substituents of the groups (1) to (6) mentioned above and the aryl group which may be substituted, a new substituent may be introduced for the purpose of improving the solubility or controlling the absorption wavelength of the relevant phthalocyanine compound. As typical examples of these substituents, halogen atoms, alkoxycarbonyls the alkoxy group of which is a linear or branched alkoxy of 1 to 20 carbon atoms which may be substituted, aryloxycarbonyl groups which may be substituted, linear or branched alkyl groups of 1 to 12 carbon atoms which may be substituted, linear or branched alkoxy groups of 1 to 12 carbon atoms, linear or branched monoalkylamino groups of 1 to 20 carbon atoms, linear or branched dialkylamino groups of 1 to 20 carbon atoms, cyclohexyl groups, phenoxy groups which may be substituted, and anilino groups or nitro groups which may be substituted may be cited.

When the substituents of the groups (1) to (6) as mentioned above are an alkoxycarbonyl group having a secondary or higher alkyl group directly linked to the carbonyl group and partially brominated derivatives thereof, the relevant phthalocyanine compounds excel in solubility and consequently manifest excellent film-forming properties. They, when they in an optical recording medium, particularly excel in such optical properties as reflectance and recording sensitivity. They prove particularly favorable in respect that they possess properties adaptable for a high-speed recording type compact disc.

As typical examples of the phthalocyanine compound to be used in this invention, the following compounds may be cited.

Compound 47: Tetrakis(4-(2-bromoethoxycarbonyl)-2-phenylphenoxy)dodecafluoro vanadyl phthalocyanine;

Compound 48: Bis(2-(2-bromoethoxycarbonyl)-6-phenylphenoxy) bis(2-ethoxycarbonyl-6-phenylphenoxy)dodecafluoro titanyl phthalocyanine;

Compound 49: Tetrakis(2-(1,3-dibromo-2-propoxycarbonyl)-6-phenylphenoxy)dodecafluoro vanadyl phthalocyanine;

Compound 50: Tetrakis(2,4-di(6-bromohexyloxycarbonyl)-6-phenylphenoxy) dodecafluoro copper phthalocyanine;

Compound 51: Tetrakis(2-(2-bromoethyl)-6-phenylphenoxy) dodecafluoro vanadyl phthalocyanine;

Compound 52: Tetrakis(4-(2-bromoethoxy)-2-isopropoxycarbonyl-6-phenylphenoxy)dodecafluoro iron phthalocyanine;

Compound 53: Tetrakis(2-(2-bromoethoxy)-6-phenylphenoxy) dodecafluoro vanadyl phthalocyanine;

Compound 54: Tetrakis(2-(2-bromoethoxy)carbonyl-6-phenylphenoxy)dodecafluoro vanadyl phthalocyanine;

Compound 55: Tetrakis(2-(1-bromo-2-propoxycarbonyl-6-phenylphenoxy)dodecafluoro vanadyl phthalocyanine;

Compound 56: Bis(2-(2-bromoethyl)-6-phenylphenoxy) tetradecafluoro (dichloro tin) phthalocyanine;

Compound 57: Octakis(4-(6-bromohexyl)-2-phenylphenoxy) octafluoro palladium phthalocyanine;

Compound 58: Tetrakis(2-(2-bromoethoxycarbonyl)-6-phenylphenoxy)tetrakis(2-ethoxycarbonyl-6-phenylphenoxy) octafluoro (dichloro tin) phthalocyanine;

Compound 59: Tetrakis(2-(2,3-dibromo-1-propoxy) carbonyl-6-phenylphenoxy)dodecafluoro vanadyl phthalocyanine.

Now, the method for producing a novel phthalocyanine compound of this invention will be described in detail below.

First, the novel phthalocyanine compound of this invention can be produced by causing either a phthalonitrile compound alone substituted with a phenoxy group to be substituted with an aryl group which may be substituted, or a mixture of the phthalonitrile compound with a phthalonitrile to be unsubstituted with the phenoxy group to react with a metal compound.

The phthalonitrile compound to be substituted with the phenoxy group mentioned above may have a part of or all the residues thereof substituted with a substituent other than a phenoxy group. The expression "phthalocyanine compound alone substituted with the phenoxy group mentioned above" does not need to be limited to a phthalocyanine compound which is substituted solely with a phenoxy group but may be construed as embracing a phthalocyanine compound which is substituted with the phenoxy group mentioned above and further has a part of or all the residues thereof substituted with a substituent other than the phenoxy group or a phthalocyanine compound which combines the two phthalocyanine compounds mentioned above. Further, the phthalonitrile which is not substituted with the phenoxy group mentioned above may have a part of or all the substitutable positions of the benzene nucleus thereof substituted with a substituent other than the phenoxy group. Specifically, the statement "phthalonitrile to be unsubstituted with the phenoxy group mentioned above" does not need to be limited to a phthalonitrile which is not substituted with the phenoxy group but may be construed as embracing a phthalonitrile compound which has a part of or all the substitutable positions of the benzene nucleus substituted with a substituent other than the phenoxy group and a phthalonitrile compound combining both of the phthalonitrile compounds. The expression "mixture of a phthalonitrile compound substituted with the phenoxy group with a phthalonitrile compound to be unsubstituted with the phenoxy group," therefore, refers to a mixture which comprises one or more phthalonitrile compounds substituted with the phenoxy group mentioned above and one or more phthalonitriles to be unsubstituted with the phenoxy group mentioned above.

As typical examples of the substituent other than the phenoxy group mentioned above in the phthalonitrile compound alone substituted with the phenoxy group or in the phthalonitrile to be unsubstituted with the phenoxy group, halogen atoms, alkyl group, aryl group, heterocyclic group, cyano group, hydroxyl group, nitro group, amino group (including a substituted amino group), alkoxy group, acylamino group, aminocarbonyl amino group, sulfamoyl amino group, alkylthio group, arylthio group, alkoxycarbonyl amino group, sulfonyl amino group, carbamoyl group, sulfamoyl group, sulfonyl group, alkoxycarbonyl group, heterocyclic oxy group, azo group, acyloxy group, carbamoyl oxy group, silyloxy group, aryloxycarbonyl group, imide group, heterocyclic thio group, sulfinyl group, phosphoryl group, and acyl group may be cited. These substituents may be used either alone or in the form of a mixture of two or more members. Among other substituents mentioned above, halogen atoms prove favorable. Among other halogen atoms, chlorine atom and fluorine atom prove particularly advantageous. Fluorine atom is the best choice.

The phthalonitrile which is used for the production of the phthalocyanine compound of this invention may be a phthalonitrile compound alone which is substituted with the phenoxy group mentioned above or a mixture of this phthalonitrile compound with a phthalonitrile to be unsubstituted with the phenoxy group mentioned above. This invention nevertheless prefers to use the phthalonitrile compound alone which is substituted with the phenoxy group.

Now, the method for producing the compound represented by the general formula (2) which is preferred among the novel phthalocyanine compounds according to this invention will be described in detail below.

The favorable novel phthalocyanine compound represented by the general formula (2) mentioned above can be produced, for example, by causing a phthalonitrile compound represented by the following general formula (4):

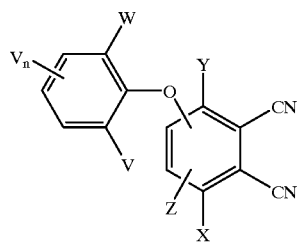

(4)

[wherein X, Y, and Z each represent a hydrogen atom or a halogen atom, preferably at least one of X, Y, and Z is a fluorine atom, W represents an aryl group which may be substituted, and V represents one member selected from the class of substituents of the following (1) to (7) groups:
(1) $R^1$
(2) $CO_2R^2$
$CO_2(CH_2CH_2O)_aR^3$
(4) $CO_2(CH_2CH_2CH_2O)_bR^4$
(5) $O[(CH_2)_cO]_dR^5$
(6) $CO_2(CH_2)_eR^6$

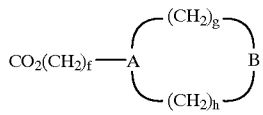

(wherein $R^1$, $R^2$, $R^3$, $R^4$, $R^5$, $R^6$, A, B, a, b, c, d, e, f, g, and h have the same meanings as defined above) to react with a metal compound.

In this case, X, Y, and Z are preferred to be invariably a fluorine atom in the general formula (4).

In the method for producing the novel phthalocyanine compound of this invention, although the reaction between either the phthalonitrile compound alone mentioned above or the mixture thereof with a phthalonitrile unsubstituted with the phenoxy group and the metal compound may be carried out in the absence of a solvent, it is preferably performed in the presence of an organic solvent. The organic solvent is only required to be an inert solvent incapable of reacting with the starting materials. As typical examples of the organic solvent, inert solvents including benzene, toluene, xylene, nitrobenzene, monochlorobenzene, dichlorobenzene, trichlorobenzene, 1-chloronaphthalene, 1-methyl naphthalene, ethylene glycol, and benzonitrile; and non-protonic polar solvents including pyridine, N,N-dimethyl formamide, N-methyl-2-pyrrolidinone, N,N-dimethyl acetophenone, triethyl amine, tri-n-butyl amine, dimethyl sulfoxide, and sulforan may be cited. Among other organic solvents cited above, 1-chloronaphthalene, 1-methyl naphthalene, and benzonitrile prove particularly advantageous.

According to this invention, in 100 parts (meaning "parts by weight" invariably herein) of an organic solvent, 2 to 40 parts, preferably 20 to 35 parts, of a phthalonitrile compound or a mixture thereof with a phthalonitrile unsubstituted with a relevant phenoxy group and 1 to 2 mols, preferably 1.1 to 1.5 mols, of a metal compound per 4 mols of the phthalonitrile compound or the mixture thereof with the phthalonitrile unsubstituted with the phenoxy group are left reacting at a temperature in the range of 30° to 250° C., preferably 80° to 200° C.

As typical examples of the metal compound, halogen compounds such as chlorides, bromides, and iodides, metal oxides, organic metal salts such as acetates, complex compounds such as acetyl acetonate, metal carbonyl compounds, and metallic powder may be cited.

In this invention, the phthalonitrile compound as the starting material such as, for example, a phthalonitrile compound represented by the general formula (4), can be synthesized according to the Step A of the following scheme (wherein in this scheme, U represents a halogen atom). The novel phthalocyanine compound represented by the general formula (2) of this invention (Compounds 1 to 26 and 31 to 46 as cited above) can be synthesized from the raw material formed solely of such a phthalonitrile compound as mentioned above by the Step B of the scheme.

Step A

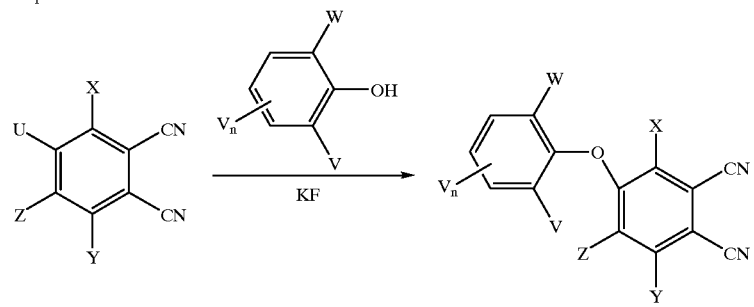

Step B

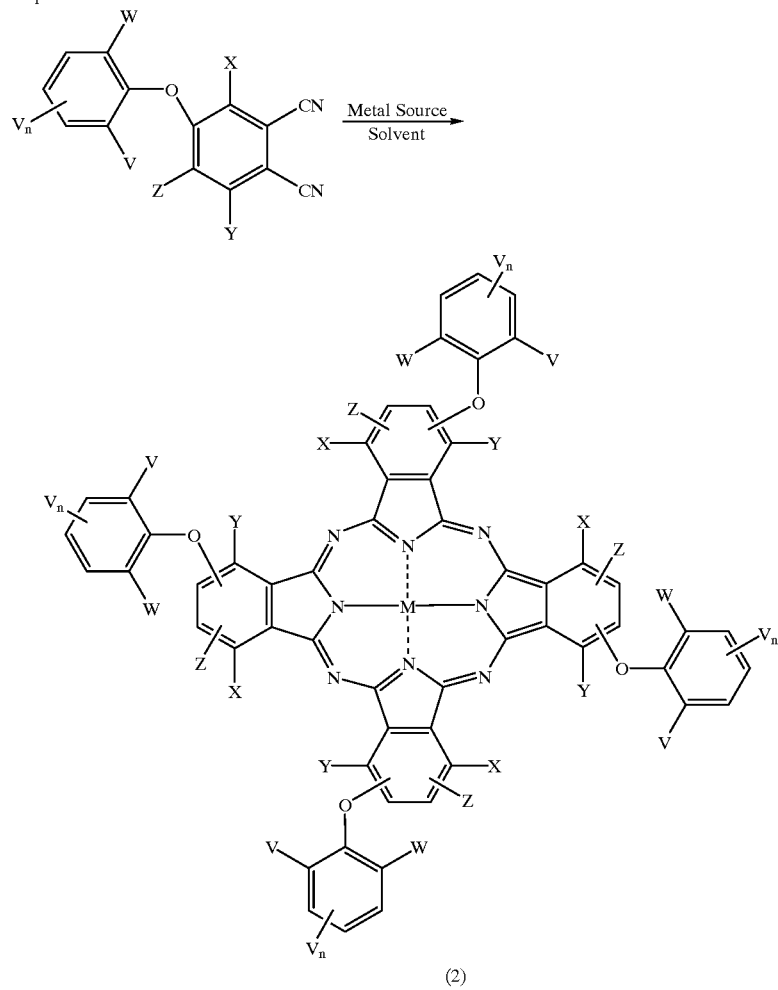

(2)

The Compounds (27) and (28) as the novel phthalocyanine compound can be synthesized by a method similar to that of synthesizing the novel phthalocyanine compound represented by the general formula (2). To be specific, the Compounds (27) and (28) as the novel phthalocyanine compound can be synthesized by using a mixture of 3,4,5,6-tetrafluorophthalonitrile and a phthalonitrile compound represented by the general formula (4) at a molar ratio of 1:1 as the raw material at Step B of the above scheme. Further, the Compounds (29) and (30) as the novel phthalocyanine compound can be synthesized by using phenol as a raw material of Step A of the scheme mentioned above in an amount twice as large as in the raw material thereby manufacturing a phthalonitrile compound represented by the following general formula (5):

(5)

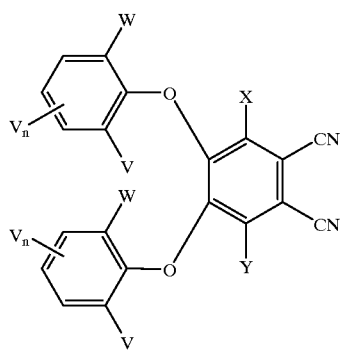

and then using the phthalonitrile compound represented by the general formula (5) as the raw material at Step B.

Preferably, in the above-mentioned scheme, X, Y and Z are invariably a halogen atom. More preferably, U, X, Y and Z are invariably a fluorine atom. The fact that U, X, Y and Z are invariably a fluorine atom is advantageous in that the phthalocyanine compound of this invention can be produced efficiently.

Alternatively, the novel phthalocyanine compound of this invention can be produced by causing either a phthalonitrile compound alone to be substituted with a phenoxy group to be substituted both with an aryl group which may be substituted and a bromine atom-containing substituent, or a mixture of the phthalonitrile compound with a phthalonitrile to be unsubstituted with the phenoxy group to react with a metal compound.

The phthalonitrile to be used for the production of the phthalocyanine compound of this invention may be either a phthalonitrile compound alone substituted with the phenoxy group mentioned above, at least one of the phenoxy groups substituted with an aryl group which may be substituted and a bromine atom-containing substituent, or a mixture thereof with a phthalonitrile to be unsubstituted with the phenoxy group. The present invention nevertheless prefers the phthalonitrile to be the phthalonitrile compound alone substituted with the phenoxy group mentioned above, at least one of the phenoxy groups substituted with an aryl group which may be substituted and a bromine atom-containing substituent.

The method for the production of the compound represented by the general formula (3) which is preferred among the novel phthalocyanine compounds of this invention will be described in detail below.

The preferred novel phthalocyanine compound represented by the general formula (3) mentioned above can be produced by causing a phthalonitrile compound represented by the following general formula (6):

(6)

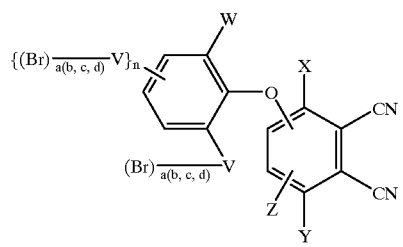

[wherein a (or b, c, d) represents an integer in the range of 0 to 3, the total number of bromine atoms involved in substituent is an integer in the range of 2 to 12, n represents an integer in the range of 0 to 3, W represents an aryl group which may be substituted, and V represents one member selected from the class of substituents of the following (1) to (3) groups:

group (1) $R^7$ group (2) $CO_2R^8$ group (3) $O[(CH_2)_cO]_dR^9$ (wherein $R^7$, $R^8$, $R^9$, c, and d have the same meanings as defined above)] to react with a metal compound, for example.

In the method for the production of the phthalocyanine compound of this invention, although the reaction of the phthalonitrile compound alone or the mixture thereof with the phthalonitrile having no phenoxy groups substituted with a metal compound can be carried out in the absence of a solvent, it is preferably performed using an organic solvent. The organic solvent may be any solvent which is unreactive and inert against the starting materials. As typical examples thereof, such inert solvents as benzene, toluene, xylene, nitrobenzene, monochlorobenzene, dichlorobenzene, trichlorobenzene, 1-chloronaphthalene, 1-methyl naphthalene, ethylene glycol, and benzonitrile; and such non-protonic polar solvents as pyridine, N,N-dimethylformamide, N-methyl-2-pyrrolidinone, N,N-dimethylacetophenone, triethylamine, tri-n-butylamine, dimethyl sulfoxide, and sulfolane may be used. Preferably, 1-chloronaphthalene, 1-methylnaphthalene, and benzonitrile may be used.

According to this invention, in 100 parts (meaning "parts by weight" invariably herein) of an organic solvent, 2 to 40 parts, preferably 20 to 35 parts, of a phthalonitrile compound or a mixture thereof with a phthalonitrile unsubstituted with a relevant phenoxy group and 1 to 2 mols, preferably 1.1 to 1.5 mols, of a metal compound per 4 mols of the phthalonitrile compound or the mixture thereof with the phthalonitrile unsubstituted with the phenoxy group are left reacting at a temperature in the range of 30° to 250° C., preferably 80° to 200° C.

As typical examples of the metal compound, halogen compounds such as chlorides, bromides, and iodides, metal oxides, organic metal salts such as acetates, complex compounds such as acetyl acetonate, metal carbonyl compounds, and metallic powder may be cited.

In this invention, the phthalonitrile compound as the starting material such as, for example, a phthalonitrile compound represented by the general formula (6) can be synthesized according to the Step A of the following scheme (wherein in this scheme, U represents a halogen atom). Then, the novel phthalocyanine compound of this invention represented by the general formula (3) can be obtained by using the raw material formed solely of the phthalonitrile compound alone through Step B.

Step A

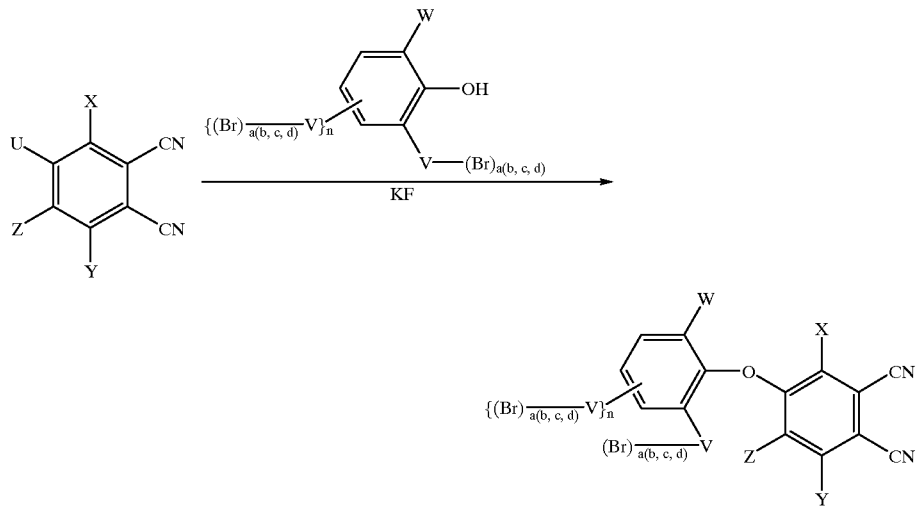

Step B

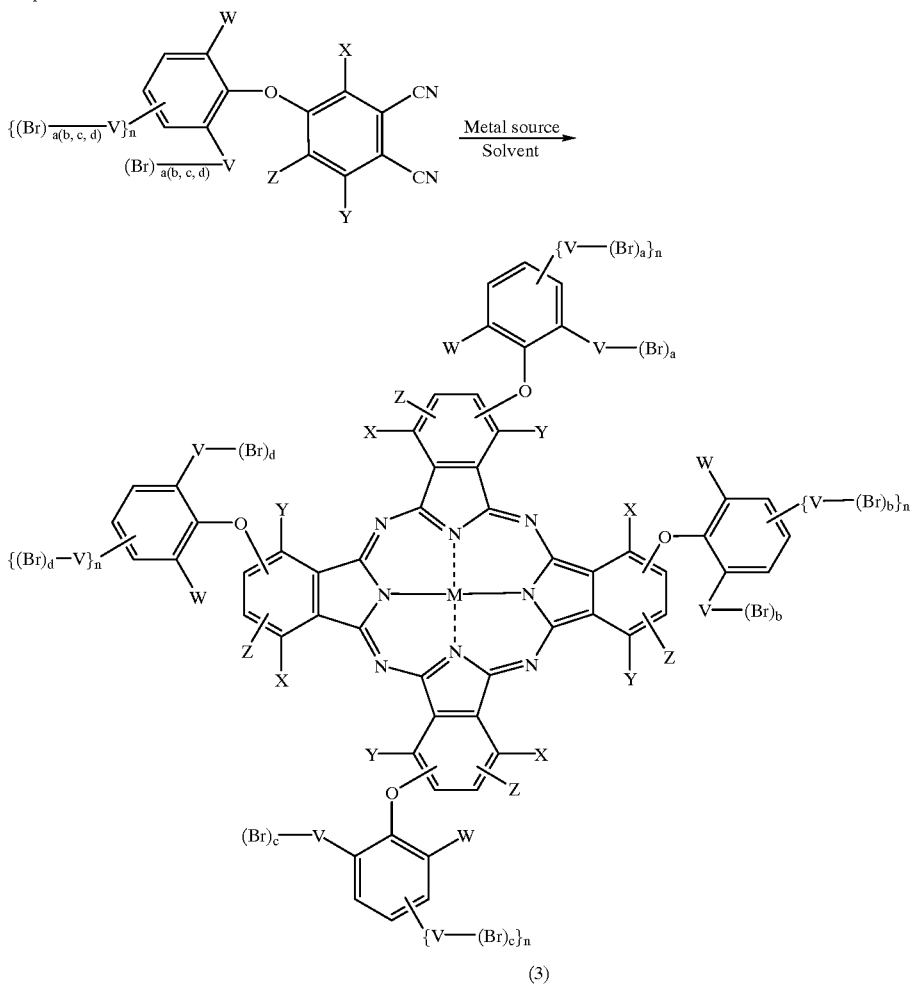

(3)

The Compound (56) as the novel phthalocyanine compound can be synthesized by a method similar to that of synthesizing the novel phthalocyanine compound represented by the general formula (3). To be specific, the Compound (56) can be synthesized by using a mixture of 3,4,5,6-tetrafluorophthalonitrile and a phthalonitrile compound represented by the general formula (6) at a molar ratio of 1:1 as the raw material at Step B of the above scheme. Further, the Compound (57) as the novel phthalocyanine compound can be synthesized by using the phenol of the raw material of Step A of the scheme mentioned above in an amount twice as large as in the raw material thereby manufacturing a phthalonitrile compound represented by the following general formula (7):

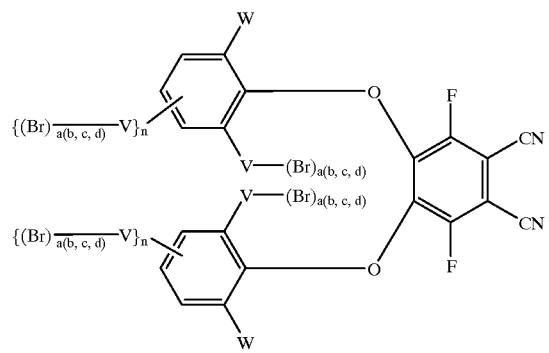

(7)

and then using the phthalonitrile compound represented by the general formula (7) as the raw material at Step B.

Preferably, in the above-mentioned scheme, X, Y and Z are invariably a halogen atom. More preferably, U, X, Y and Z are invariably a fluorine atom. The fact that U, X, Y and Z are invariably a fluorine atom is advantageous in that the phthalocyanine compound of this invention can be produced efficiently.

This invention prefers the phthalocyanine compound of this invention to be synthesized from a phthalonitrile compound which is substituted with a phenoxy group possessing a bromine atom-containing substituent. Alternatively, the phthalocyanine compound of this invention may be produced by provisionally synthesizing a phthalocyanine compound possessing no bromine atom from a phthalonitrile compound substituted with a phenoxy group possessing no bromine atoms and subsequently brominating the phthalocyanine compound.

The present invention further concerns a phthalocyanine composition comprising one or more kinds of phthalocyanine compounds contained in the following group (I) and one or more kinds of phthalocyanine compounds contained in the following group (II).

Group (I): phthalocyanine compounds represented by the general formula (2):

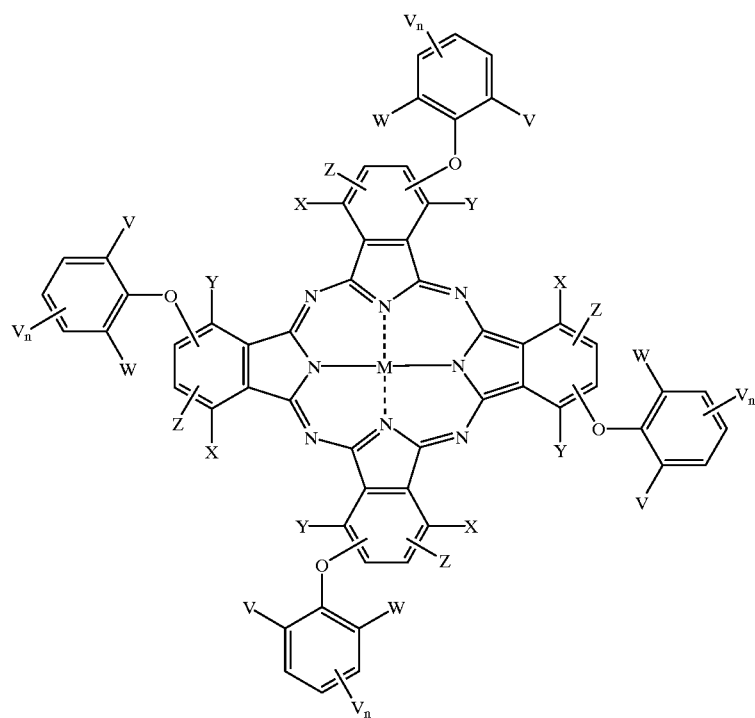

(2)

[wherein X, Y, and Z each represent a hydrogen atom or a halogen atom, W represents an aryl group which may be substituted, V represents at least one substituent selected from the class of the substituents of (1) to (7) groups defined in the (2) above, n represents an integer in the range of 0 to 3, and M represents a metal, a metal oxide, or a halogenated metal]; and Group (II): bromine atom-containing phthalocyanine compounds.

Among the phthalocyanine compounds represented by the general formula (2), the phthalocyanine compound wherein at least one of the substituent X, Y and Z in the general formula (2) is a fluorine atom, and V is $CO_2R^2$ (wherein $R^2$ represents a branched alkyl group of 3 to 20 carbon atoms which may be substituted) proves particularly preferable. Among the phthalocyanine compounds represented by the general formula (2), the phthalocyanine compound wherein V in the general formula (2) is $CO_2R^2$ (wherein $R^2$ represents a secondary or tertiary alkyl group of 5 to 20 carbon atoms and containing 2 to 4 secondary or higher carbon atoms which may be substituted) may be particularly preferably used. Further, among the bromine atom-containing phthalocyanine compounds, the phthalocyanine compound which is substituted with at least one alkoxy group or aryloxy group proves favorable. The phthalocyanine compounds represented by the general formula (3) prove particularly favorable.

Although the weight ratio of the phthalocyanine compound represented by the general formula (1) to the bromine atom-containing phthalocyanine compound is not particularly restricted and can be adjusted to a given ratio, it is preferably in the range of 5:95 to 95:5, more preferably in the range of 50:50 to 95:5.

By using a composition comprising a mixed phthalocyanine compounds as mentioned above, the temperature of initiating thermal decomposition, as determined by the thermogravimetry, is lowered, as compared with the case of using the phthalocyanine compound alone. By the decreasing effect of the temperature of initiating thermal decomposition, the recording sensitivity, when used in an optical recording medium, can be improved. Therefore, the composition ration is desirably adjusted suitably within the range which is optical for being capable of improving the recording sensitivity, depending on the combination of the phthalocyanine compounds to be actually used.

The phthalocyanine composition according to this invention can be obtained by mixing at least one phthalocyanine compound represented by the general formula (2) as described above with at least one bromine atom-containing phthalocyanine compound by suitable means. As the mixing means, a method which comprises mixing the phthalocyanine compounds in the original powdery form and a method which comprises dissolving and mixing the phthalocyanine compounds in a suitable solvent may be cited. A method which comprises dissolving and mixing the phthalocyanine compounds in a suitable solvent proves preferable. As typical examples of the solvent to be used for dissolving, such aliphatic or alicyclic hydrocarbon type solvents as hexane, octane, and cyclohexane; such aromatic hydrocarbon type solvents as toluene and xylene; such alcohol type solvents as methyl alcohol, ethyl alcohol, isopropyl alcohol, allyl alcohol, 2-methoxy ethanol, 2-ethoxy ethanol, and diacetone alcohol; such halogen type solvents as methylene chloride and chloroform; such ether type solvents as 1,4-dioxane and tetrahydrofuran; such ketone type solvents as acetone, methyl ethyl ketone, and methyl isobutyl ketone; and such ester type solvents as ethyl acetate and butyl acetate may be cited. The phthalocyanine composition of this invention can be obtained by dissolving and mixing the phthalocyanine compounds in the solvent as mentioned above and removing the solvent from the solution of the mixed phthalocyanine compounds. For such a solvent as not eroding a substrate of an optical recording medium, the solution of itself can be used to be applied on a substrate without removing the solvent.

The phthalocyanine compound and the phthalocyanine composition of the present invention exhibit high solubility, form only a small association peak in the absorption spectrum of a thin film made thereof, produce a sharp monomer peak, and excel in lightfastness. A phthalocyanine compound alone of this invention or a mixture of two or more such phthalocyanine compounds, when used in an optical recording medium, manifests excellent reflectance and sensitivity. It, therefore, can manifest excellent effects when used in a transparent substrate of resin which particularly necessitates such properties as reflectance and sensitivity and in a postscript type optical recording medium adapted for a compact disc comprising a recording layer and a metallic reflecting layer provided on the substrate such as, for example, a postscript type optical recording medium which affords compatibility and shareability for the players of audio CD's for the regeneration of music, PHOTO-CD's for the conservation of photographs, and CD-ROM's for the operation of computers.

In an optical recording medium having a phthalocyanine compound contained in a recording medium formed on a substrate, the phthalocyanine compound which has the substituents V and W in the general formula (2) linked to the 2 and 6 positions of the phenoxy group notably represses the association peak and sharpens the monomer peak in the absorption spectrum of a thin film. The use of this phthalocyanine compound in the optical recording medium, therefore, proves preferably in terms of reflectance and recording sensitivity. In the general formula (2), n represents an integer in the range of 0 to 4, preferably 1 or 2.

Since the phthalocyanine compound of this invention acquires excellent characteristics in terms of controlling absorption wavelength while retaining lightfastness, optical properties in a thin film (thereby repressing the association peak and sharpening the monomer peak), and solubility in an organic solvent, it can manifest outstanding effects for an optical recording medium adapted for a compact disc.

The disc substrate to be used in this case is preferred to allow passage therethrough of a light to be used for recording or reading a signal. It is preferred to have a transmittance of not less than 85% and as small optical anisotropy as possible. As typical examples of the material for the disc substrate, glass, acrylic resin, polycarbonate resin, polyester resin, polyamide resin, vinyl chloride resin, polystyrene resin, and epoxy resin may be cited. Among other materials mentioned above, the polycarbonate resin proves preferable in terms of optical properties, ease of fabrication, and mechanical strength.

The dye mentioned above is first deposited on the substrate and then a metallic reflecting layer is formed on the dye layer. As typical examples of the metal to be used for the reflecting layer, aluminum, silver, gold, copper, and platinum may be cited. This reflecting layer is generally formed by such methods as vacuum deposition and sputtering.

In the optical recording medium of this invention, it is generally preferable to adopt the method of coating for the formation of the recording layer containing the dye on the substrate. The coating method is known in several types, i.e. a spin coating method, a dipping method, and a roll-coating method. It is particularly favorable to adopt a spin coating method. The organic solvent to be used in this case is required to avoid corroding the substrate. As typical examples of the organic solvent, aliphatic or alicyclic hydrocarbon type solvents such as hexane, octane, and cyclohexane and alcohol type solvents such as methyl alcohol, ethyl alcohol, isopropyl alcohol, allyl alcohol, 2-methoxyethanol, 2-ethoxyethanol, and diacetone alcohol may be cited. Since the dye of this invention mentioned above is dissolved particularly satisfactorily in an alcohol type solvent, it is preferable to use such a solvent contemplated herein.

The CD as one form of the optical recording medium of this invention, from the viewpoint of the compatibility for players, is required to exhibit reflectance of not less than 60% to the reading laser beam to be passed through the substrate.

These requirements can be fulfilled by optimizing the thickness of the relevant layer in conformity with the particular dye to be used. This thickness is generally in the range of 50 nm to 300 nm, particularly 80 nm to 200 nm.

Now, this invention will be described more specifically below with reference to working examples.

EXAMPLE 1

Production of Compound 5

In a four-neck flask having an inner volume of 100 ml, 4.36 g (0.01 mol) of a phthalonitrile compound represented by the following structural formula (8), 0.47 g (3 m.mols) of vanadium trichloride, and 15 ml of benzonitrile were placed and left reacting therein at 175° C. for four hours. After the reaction was completed, the solvent was expelled by distillation and the solid residue was washed with 200 ml of methyl alcohol, to obtain 4.0 g of a green cake [tetrakis(2-isopropoxycarbonyl-6-phenylphenoxy)dodecafluoro vanadyl phthalocyanine (Compound 5)] as the product aimed at (a yield 88.4%, based on the phthalonitrile).

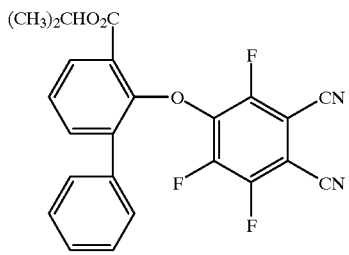

(8)

Visible absorption spectrum
  Maximum absorption wavelength
    In 2-ethoxyethanol
      715.2 nm ($\epsilon=1.45\times10^5$)
    In thin film 731.4 nm
Solubility
  In 2-ethoxyethanol 14% by weight

| | Elementary analyses | | | |
|---|---|---|---|---|
| | H | C | N | F |
| Calculated | 3.34% | 63.62% | 6.18% | 12.58% |
| Found | 3.41% | 62.93% | 6.31% | 13.01% |

EXAMPLE 2

Production of Compound 6

In a four-neck flask having an inner volume of 100 ml, 4.64 g (0.01 mol) of a phthalonitrile compound represented by the following structural formula (9), 0.47 g (3 m.mols) of vanadium trichloride, and 15 ml of benzonitrile were placed and left reacting therein at 175° C. for four hours. After the reaction was completed, the solvent was expelled by distillation and the solid residue was washed with 200 ml of methyl alcohol, to obtain 4.4 g of a green cake [tetrakis(2-(3-pentoxy)carbonyl-6-phenylphenoxy)dodecafluoro vanadyl phthalocyanine (Compound 6)] as the product aimed at (a yield 91.1%, based on the phthalonitrile).

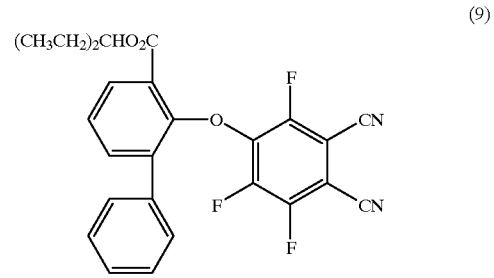

(9)

Visible absorption spectrum
  Maximum absorption wavelength
    In 2-ethoxyethanol
      713.1 nm ($\epsilon=1.61\times10^5$)
    In thin film 729.6 nm
Solubility
  In 2-ethoxyethanol 15% by weight

| | H | C | N | F |
|---|---|---|---|---|
| Calculated | 3.98% | 64.90% | 5.82% | 11.84% |
| Found | 4.02% | 64.36% | 5.93% | 11.65% |

EXAMPLE 3

Production of Compound 8

In a four-neck flask having an inner volume of 100 ml, 4.50 g (0.01 mol) of a phthalonitrile compound represented by the following structural formula (10), 0.47 g (3 m.mols) of vanadium trichloride, and 15 ml of benzonitrile were placed and left reacting therein at 175° C. for four hours. After the reaction was completed, the solvent was expelled by distillation and the solid residue was washed with 200 ml of methyl alcohol, to obtain 4.3 g of a green cake [tetrakis (2-tert-butoxycarbonyl-6-phenylphenoxy)dodecafluoro vanadyl phthalocyanine (Compound8)] as the product aimed at (a yield 91.1%, based on the phthalonitrile).

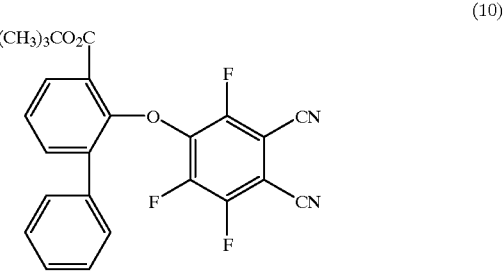

(10)

Visible absorption spectrum
  Maximum absorption wavelength
    In 2-ethoxyethanol
      714.2 nm ($\epsilon=1.61\times10^5$)

In thin film 727.5 nm
Solubility
In 2-ethoxyethanol 15% by weight

| Elementary analyses | | | |
|---|---|---|---|
| H | C | N | F |
| Calculated 3.67% | 64.28% | 6.00% | 12.20% |
| Found 3.81% | 64.54% | 5.96% | 11.93% |

EXAMPLES 4 TO 8

Phthalocyanine compounds were produced by following the procedure of Examples 1 to 3 while using phthalonitrile compounds and metal compounds shown in Table 1 and Table 2 instead. The yields based on the relevant phthalonitrile compounds and the maximum absorption wavelengths in 2-ethoxyethanol were as shown in Table 1 and Table 2.

TABLE 1

| Example | Compound No. | Phthalonitrile Compound | Metal Compound | Yield (%) | Maximum Absorption Wavelength (nm) |
|---|---|---|---|---|---|
| 4 | 10 | $CH_3CH_2(CH_3)CHO_2C$-[structure] | $VCl_3$ | 74.9 | 710.0 |
| 5 | 11 | $CH_3CH_2CH_2(CH_3)CHO_2C$-[structure] | $VCl_3$ | 83.6 | 713.5 |
| 6 | 12 | $CH_3OCH_2CH_2CH_2O_2C$-[structure] | $VCl_3$ | 82.5 | 714.6 |

TABLE 2

| Example | Compound No. | Phthalonitrile Compound | Metal Compound | Yield (%) | Maximum Absorption Wavelength (nm) |
|---|---|---|---|---|---|
| 7 | 16 | ![structure with CH2O2C-benzyl, biphenyl-O-tetrafluorophthalonitrile] | TiCl₄ | 67.2 | 715.4 |
| 8 | 18 | ![structure with tetrahydrofuranyl-CH2O2C, biphenyl-O-tetrafluorophthalonitrile] | SnCl₄ | 71.4 | 712.0 |
| 9 | 21 and/or 22 | ![structure with (CH3)2CHO2C, biphenyl(Br)-O-tetrafluorophthalonitrile] and/or ![structure with (CH3)2CHO2C, Br-biphenyl-O-tetrafluorophthalonitrile] | VCl₃ | 78.3 | 712.5 |

EXAMPLE 9

Production of Compound 21 and/or 22

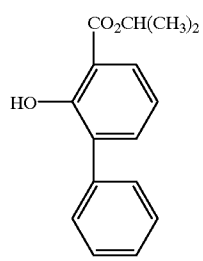

(11)

In a four-neck flask having an inner volume of 100 ml, 10.2 g (0.04 mol) of isopropyl 3-phenylsalicylate, i.e. an ester compound represented by the structural formula (11) mentioned above, 0.1 g (1.8 m.mols) of iron powder, and 20 ml of chloroform were placed and stirred at room temperature. To the stirred mixture, 6.23 g (0.04 mol) of bromine was added through a dropping funnel over a period of about 30 minutes. After the dropwise addition, the resultant mixture was continuously stirred at room temperature for five hours. After the reaction, the reaction solution was thrown into distilled water, extracted therefrom, and concentrated to obtain 12.1 g of a crude product. By subjecting this crude product to column refinement (silica gel, solvent=toluene/hexane=½), 9.5 g of a brominated ester compound represented by the following structural formula (12) and/or (13).

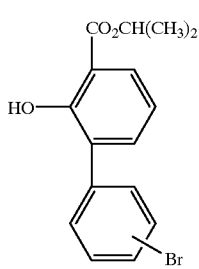

(12)

-continued

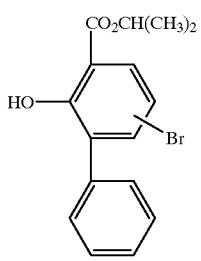

Mass spectrum

Parent peak 334, 336

| | Elementary analyses | | | |
|---|---|---|---|---|
| | H | C | O | F |
| Calculated | 4.53% | 57.48% | 14.37% | 23.63% |
| Found | 4.48% | 57.56% | 15.14% | 22.82% |

Then, in a four-neck flask having an inner volume of 100 ml, 6.72 g (0.02 mol) of a brominated ester compound represented by the structural formula (12) and/or (13) mentioned above, 3.81 g (0.02 mol) of tetrafluorophthalonitrile, 3.48 g (0.06 mol) of potassium fluoride, and 50 ml of acetonitrile were placed and left reacting under reflux for five hours. After the reaction, the reaction mass was filtered to separate potassium fluoride and distilled to expel the solvent. By washing the resultant solid residue with 200 ml of hexane, 9.1 g of a phthalonitrile compound represented by the following structural formula (14) and/or (15).

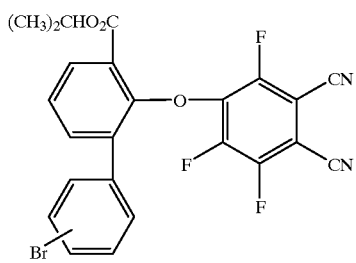

(14)

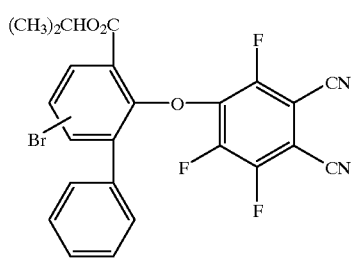

(15)

Mass spectrum

Parent peak 514, 516

| | Elementary analyses | | | | |
|---|---|---|---|---|---|
| | H | C | N | F | Br |
| Calculated (%) | 2.74 | 56.03 | 5.45 | 11.09 | 15.35 |
| Found (%) | 2.81 | 55.72 | 5.42 | 10.86 | 15.27 |

Then, in a four-neck flask having an inner volume of 100 ml, 5.15 g (0.01 mol) of a phthalonitrile compound represented by the structural formula (14) and/or (15) mentioned above, 0.47 g (3 m.mols) of vanadium trichloride, and 15 ml of benzonitrile were placed and left reacting therein at 175° C. for four hours. After the reaction was completed, the solvent was expelled by distillation and the solid residue was washed with 200 ml of methyl alcohol, to obtain 4.2 g of a green cake as the product aimed at (yield 78.3%, based on the phthalonitrile).

Visible absorption spectrum

Maximum absorption wavelength
In 2-ethoxyethanol
712.5 nm ($\epsilon=1.45\times10^5$)
In thin film 730.5 nm Solubility
In 2-ethoxyethanol 12% by weight

| | Elementary analyses | | | | |
|---|---|---|---|---|---|
| | H | C | N | F | Br |
| Calculated (%) | 2.66 | 54.26 | 5.28 | 10.74 | 14.87 |
| Found (%) | 2.71 | 54.92 | 5.15 | 10.34 | 14.26 |

EXAMPLE 10

Production of Compound 35

In a four-neck flask having an inner volume of 100 ml, 5.81 g (50 m.mols) of 2,4-dimethyl-3-pentanol, 6.30 g (55 m.mols) of methane sulfonyl chloride, and 50 ml of methylene chloride were placed and cooled to 0° C. To the cooled mixture, 7.59 g (75 m.mols) of triethyl amine was added dropwise over a period of one hour with the reaction temperature retained meanwhile. The reactants in the resultant reaction mixture were left reacting at 0° C. for one hour. After the reaction, the reaction mass was thrown into 50 ml of ice water to obtain an organic layer by separation. The organic layer thus obtained was washed with 50 ml of a diluted aqueous hydrochloric acid solution, 50 ml of water, 50 ml of a saturated aqueous sodium hydrogen carbonate solution, and 50 ml of a saturated saline solution. Then, by removing the solvent from the organic layer, 8.94 g (46 m.mols) of (2,4-dimethyl-3-pentyl) methanesulfonate was obtained as the product aimed at.

In a four-neck flask having an inner volume of 100 ml, 4.86 g (25 m.mols) of (2,4-dimethyl-3-pentyl) methanesulfonate, 5.36 g (25 m.mols) of 3-phenylsalicylic acid, 2.65 g (25 m.mols) of sodium carbonate, and 50 ml of dimethyl formamide were placed and left reacting at 90° C. for three hours. After the reaction, the reaction mass was thrown into 100 ml of ice water and extracted twice with 150 ml of ethyl acetate. The organic layer obtained consequently was washed twice with 50 ml of water. Then, by distilling the organic layer thereby expelling the solvent by evaporation, 5.00 g (16 m.mols) of 2-(2,4-dimethyl-3-pentyloxy)carbonyl-6-phenylphenol was obtained as the product aimed at.

In a four-neck flask having an inner volume of 100 ml, 3.00 g (15 m.mols) of 3,4,5,6-tetrafluorophthalonitrile, 4.69 g (15 m.mols) of 2-(2,4-dimethyl-3-pentyloxy)carbonyl-6-phenylphenol, 2.62 g (45 m.mols) of potassium fluoride, and 50 ml of acetonitrile were placed and left reacting under reflux for six hours. After the reaction, the reaction mass was filtered and then distilled to expel the solvent by evaporation and obtain 6.90 g (14 m.mols) of 3,5,6-trifluoro-4-(2-(2,4-dimethyl-3-pentyloxy)carbonyl-6-phenylphenoxy) phthalonitrile as the product aimed at.

In a four-neck flask having an inner volume of 100 ml, 4.93 g (10 m.mols) of 3,5,6-trifluoro-4-(2-(2,4-dimethyl-3-pentyloxy) carbonyl-6-phenylphenoxy)phthalonitrile, 0.225 g (1.5 m.mols) of vanadium trioxide, 0.029 g (0.15 m.mol) of p-toluenesulfonic acid monohydrate, and 20 ml of benzonitrile were placed and left reacting at 175° C. for four hours. After the reaction, the reaction mass was distilled to expel the solvent by evaporation. The resultant solid residue was washed with 200 ml of methyl alcohol to obtain 2.70 g of a green cake [tetrakis(2-(2,4-dimethyl-3-pentyloxy) carbonyl-6-phenylphenoxy)dodecafluoro vanadyl phthalocyanine] was obtained as the product aimed at. The yield was 53.0% based on the phthalonitrile. The visible absorption spectrum, solubility, and elementary analyses of the product are shown below.

Visible absorption spectrum

Maximum absorption wavelength
　　　　In 2-ethoxyethanol
　　　　　　710.5 nm ($\epsilon=1.69\times10^5$)
　　　　In thin film 729.0 nm Solubility In 2-ethoxyethanol 15% by weight

| | Elementary analyses | | | |
|---|---|---|---|---|
| | H | C | N | F |
| Calculated | 4.55% | 66.04% | 5.50% | 11.19% |
| Found | 4.61% | 65.87% | 5.38% | 11.59% |

EXAMPLE 11

Production of Compound 49

In a four-neck flask having an inner volume of 100 ml, 5.94 g (0.01 mol) of a phthalonitrile compound represented by the structural formula (16) as mentioned below, 0.47 g (3 m.mols) of vanadium trichloride, and 15 ml of benzonitrile were placed and left reacting therein at 175° C. for four hours. After the reaction was completed, the solvent was expelled by distillation and the solid residue was washed with 200 ml of methyl alcohol, to obtain 2.44 g of a green cake [tetrakis(2-(1,3-dibromo-2-propoxycarbonyl)-6-phenylphenoxy)dodecafluoro vanadyl phthalocyanine (Compound 49)] as the product aimed at (yield 40.0%, based on the phthalonitrile).

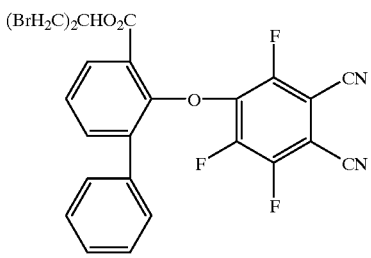

(16)

Visible absorption spectrum

Maximum absorption wavelength
　　　　In 2-ethoxyethanol
　　　　　　710.0 nm ($\epsilon=1.55\times10^5$)
　　　　In thin film 731.0 nm Solubility In 2-ethoxyethanol 15% by weight

| | Elementary analyses | | | | |
|---|---|---|---|---|---|
| | H | C | N | F | Br |
| Calculated | 2.15% | 47.32% | 4.60% | 9.36% | 25.93% |
| Found | 2.21% | 46.75% | 4.51% | 9.64% | 25.31% |

EXAMPLE 12

Production of Compound 54

In a four-neck flask having an inner volume of 100 ml, 5.01 g (0.01 mol) of a phthalonitrile compound represented by the structural formula (17) as mentioned below, 0.47 g (3 m.mols) of vanadium trichloride, and 15 ml of benzonitrile were placed and left reacting therein at 175° C. for four hours. After the reaction was completed, the solvent was expelled by distillation and the solid residue was washed with 200 ml of methyl alcohol, to obtain 2.33 g of a green cake [tetrakis(2-(2-bromoethoxy)carbonyl-6-phenylphenoxy) dodecafluoro vanadyl phthalocyanine (Compound 52)] as the product aimed at (yield 45%, based on the phthalonitrile).

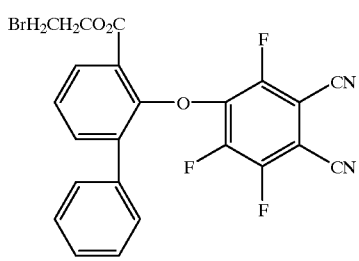

(17)

Visible absorption spectrum

Maximum absorption wavelength
　　　　In 2-ethoxyethanol
　　　　　　705.5 nm ($\epsilon=1.21\times10^5$)

In thin film 727.0 nm
Solubility
In 2-ethoxyethanol 13% by weight

| Elementary analyses | | | | | |
|---|---|---|---|---|---|
|  | H | C | N | F | Br |
| Calculated | 2.34% | 53.33% | 5.41% | 11.00% | 15.43% |
| Found | 2.41% | 53.24% | 5.46% | 10.57% | 15.22% |

EXAMPLE 13

Production of Compound 55

In a four-neck flask having an inner volume of 100 ml, 5.15 g (0.01 mol) of a phthalonitrile compound represented by the structural formula (18) as mentioned below, 0.47 g (3 m.mols) of vanadium trichloride, and 15 ml of benzonitrile were placed and left reacting therein at 175° C. for four hours. After the reaction was completed, the solvent was expelled by distillation and the solid residue was washed with 200 ml of methyl alcohol, to obtain 2.77 g of a green cake (tetrakis(2-(1-bromo-2-propoxycarbonyl-6-phenylphenoxy) dodecafluoro vanadyl phthalocyanine (Compound 55)] as the product aimed at (yield 52%, based on the phthalonitrile).

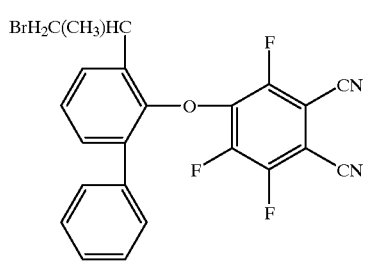

(18)

Visible absorption spectrum
  Maximum absorption wavelength
    In 2-ethoxyethanol
      705.0 nm ($\epsilon=1.55\times10^5$)
    In thin film 727.0 nm
Solubility
  In 2-ethoxyethanol 13% by weight

| Elementary analyses | | | | | |
|---|---|---|---|---|---|
|  | H | C | N | F | Br |
| Calculated | 2.65% | 54.18% | 5.27% | 10.71% | 15.02% |
| Found | 2.73% | 54.64% | 5.21% | 10.46% | 14.85% |

EXAMPLE 14

Production of Phthalocyanine Composition Formed of 50% by Weight of Compound 35 and 50% by Weight of Compound 49

In an eggplant flask having an inner volume of 100 ml, 1.00 g (0.49 m.mol) of tetrakis(2-(2,4-dimethyl-3-pentyloxy)carbonyl-6-phenylphenoxy)dodecafluoro vanadyl phthalocyanine (Compound 35), 1.00 g (0.41 m.mol) of tetrakis(2-(1,3-dibromo-2-propoxy)carbonyl-6-phenylphenoxy)dodecafluoro vanadyl phthalocyanine (Compound 49), and 20 ml of acetone were placed and stirred at 25° C. for one hour. By distilling the resultant reaction mass thereby expelling the acetone, a green cake of a phthalocyanine composition formed of 50% by weight of tetrakis(2-(2,4-dimethyl-3-pentyloxy)carbonyl-6-phenylphenoxy)dodecafluoro vanadyl phthalocyanine and 50% by weight of tetrakis(2-(1,3-dibromo-2-propoxy)carbonyl-6-phenylphenoxy)dodecafluoro vanadyl phthalocyanine was obtained as the product aimed at. The visible absorption spectrum and the solubility of the product were as are shown below.

Visible absorption spectrum
  Maximum absorption wavelength
    In 2-ethoxyethanol
      710.5 nm ($\epsilon=1.68\times10^5$)
    In thin film 729.5 nm
Solubility
  In 2-ethoxyethanol 15% by weight Control 1: Production of Compound 1 for Comparison In a four-neck flask having an inner volume of 100 ml, 4.16 g (0.01 mol) of a phthalonitrile compound represented by the structural formula (19) as mentioned below, 0.47 g (3 m.mols) of vanadium trichloride, and 15 ml of benzonitrile were placed and left reacting therein at 175° C. for four hours. After the reaction was completed, the solvent was expelled by distillation and the solid residue was washed with 200 ml of methyl alcohol, to obtain 3.60 g of a green cake [tetrakis(2-(2-tetrahydrofurfuryloxy)carbonyl-6-methylphenoxy)dodecafluoro vanadyl phthalocyanine] as the product aimed at (yield 83.2%, based on the phthalonitrile).

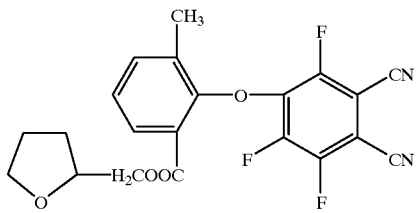

(19)

Visible absorption spectrum
  Maximum absorption wavelength
    In 2-ethoxyethanol
      711.5 nm ($\epsilon=8.22\times10^4$)
    In thin film 672.5 nm
Solubility
  In 2-ethoxyethanol 12% by weight

| Elementary analyses | | | | |
|---|---|---|---|---|
|  | H | C | N | F |
| Calculated | 3.49% | 58.24% | 6.47% | 18.16% |
| Found | 3.67% | 58.39% | 6.55% | 13.02% |

Control 2: Production of Compound 2 for Comparison

In a four-neck flask having an inner volume of 100 ml, 4.46 g (0.01 mol) of a phthalonitrile compound represented by the following structural formula (20), 0.47 g (3 m.mols) of vanadium trichloride, and 15 ml of benzonitrile were placed and left reacting therein at 175° C. for four hours. After the reaction was completed, the solvent was expelled by distillation and the solid residue was washed with 200 ml of methyl alcohol, to obtain 3.89 g of a green cake [tetrakis(2-(2-tetrahydrofurfuryloxy)carbonyl-6-ethoxyphenoxy)

dodecafluoro vanadyl phthalocyanine] as the product aimed at (yield 84.1%, based on the phthalonitrile).

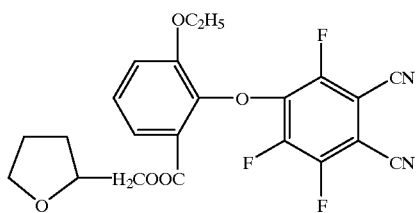

(20)

Visible absorption spectrum
  Maximum absorption wavelength
    In 2-ethoxyethanol
      711.5 nm ($\epsilon = 1.37 \times 10^5$)
    In thin film 729.0 nm
Solubility
  In 2-ethoxyethanol 13% by weight

| | Elementary analyses | | | |
|---|---|---|---|---|
| | H | C | N | F |
| Calculated | 3.70% | 57.06% | 6.05% | 12.31% |
| Found | 3.55% | 56.84% | 6.00% | 12.41% |

EXAMPLE 15

On a substrate of polycarbonate resin of 1.2 mm in thickness, 120 mm in outside diameter and 15 mm in inside diameter, and provided with a spiral guide groove of 80 nm in depth and 1.6 μm in pitch, a coating liquid prepared by dissolving the phthalocyanine compound of Example 1 at a concentration of 5% by weight in 2-methoxyethanol was applied by a spin coater to form a film of 120 nm in thickness. Then, on the applied film thus obtained, gold was vacuum deposited to form a film of 75 nm in thickness. By further forming thereon a protective coating film of an ultraviolet curing type resin, an optical recording medium was produced. When this optical recording medium was tested for a reflective index, it was found to possess stable optical properties as evinced by a reflective index of 82% exhibited in a wavelength region of 770 nm to 800 nm.

When this optical recording medium was used in recording an EFM signal at a linear speed of 1.4 m/s with an output of 5.7 mW by means of a semiconductor laser beam of 780 nm in wavelength, it succeeded in recording the signal at an error rate of less than 0.2%. The recorded signal, on analysis, was found to be on such a level as could be regenerated with a commercially available CD player.

EXAMPLES 16 TO 19

Optical recording media were manufactured by following the procedure of Example 15 while respectively using the compounds whose methods of production were shown in Examples 2 to 5. These optical recording media were tested in the same manner as in Example 15. They were found to possess stable optical properties as evinced by reflective indexes invariably exceeding 80%.

When these optical recording media were used in recording an EFM signal at a linear speed of 1.3 m/s with an output of 5.8 mW by means of a semiconductor laser beam of 780 nm in wavelength, they succeeded in recording the signal. The recorded signals, on analysis, were found to be on such levels as could be regenerated with a commercially available CD player.

EXAMPLES 20 TO 22

Optical recording media were manufactured by following the procedure of Example 15 while respectively using the compounds whose methods of production were shown in Examples 6 to 8. These optical recording media were tested in the same manner as in Example 15. They were found to possess stable optical properties as evinced by reflective indexes invariably exceeding 80%.

When these optical recording media were used in recording an EFM signal at a linear speed of 1.3 m/s with an output of 6.0 mW by means of a semiconductor laser beam of 780 nm in wavelength, they succeeded in recording the signal. The recorded signals, on analysis, were found to be on such levels as could be regenerated with a commercially available CD player.

EXAMPLE 23

An optical recording medium was manufactured by following the procedure of Example 15 while using the compound whose method of production was shown in Example 9. This optical recording medium was tested in the same manner as in Example 15. It was found to possess stable optical properties as evinced by a reflective index of 83%.

When this optical recording medium was used in recording an EFM signal at a linear speed of 1.4 m/s with an output of 5.6 mW by means of a semiconductor laser beam of 780 nm in wavelength, it succeeded in recording the signal at an error rate of less than 0.2%. The recorded signal, on analysis, was found to be on such a level as could be regenerated with a commercially available CD player.

EXAMPLE 24

An optical recording medium was manufactured by following the procedure of Example 15 while using the compound whose method of production was shown in Example 10. This optical recording medium was tested in the same manner as in Example 15. It was found to possess stable optical properties as evinced by a reflective index of 83%.

When this optical recording medium was used in recording an EFM signal at a linear speed of 2.0 m/s with an output of 5.7 mW by means of a semiconductor laser beam of 780 nm in wavelength, it succeeded in recording the signal at an error rate of less than 0.2%. The recorded signal, on analysis, was found to be on such a level as could be regenerated with a commercially available CD player.

EXAMPLE 25

An optical recording medium was manufactured by following the procedure of Example 15 while using the compound whose method of production was shown in Example 11. This optical recording medium was tested in the same manner as in Example 15. It was found to possess stable optical properties as evinced by a reflective index of 85%.

When this optical recording medium was used in recording an EFM signal at a linear speed of 2.8 m/s (twice as high) with an output of 5.7 mW by means of a semiconductor laser beam of 780 nm in wavelength, it succeeded in recording the signal at an error rate of less than 0.2%. The recorded signal, on analysis, was found to be on such a level as could be regenerated with a commercially available CD player.

EXAMPLES 26 AND 27

Optical recording media were manufactured by following the procedure of Example 15 while respectively using the compounds whose methods of production were shown in Examples 12 and 13. These optical recording media were tested in the same manner as in Example 15. They were found to possess stable optical properties as evinced by reflective indexes invariably of 80%.

When these optical recording media were used in recording an EFM signal at a linear speed of 1.3 m/s with an output of 6.0 mW by means of a semiconductor laser beam of 780 nm in wavelength, it succeeded in recording the signal at an error rate of less than 0.2%. The recorded signal, on analysis, was found to be on such a level as could be regenerated with a commercially available CD player.

EXAMPLE 28

An optical recording medium was manufactured by following the procedure of Example 15 while using the compound whose method of production was shown in Example 14. This optical recording medium was tested in the same manner as in Example 15. It was found to possess stable optical properties as evinced by a reflective index of 83%.

When this optical recording medium was used in recording an EFM signal at a linear speed of 1.4 m/s with an output of 5.0 mW by means of a semiconductor laser beam of 780 nm in wavelength, it succeeded in recording the signal at an error rate of less than 0.2%. The recorded signal, on analysis, was found to be on such a level as could be regenerated with a commercially available CD player.

EXAMPLES 29 AND 30

Optical recording media were manufactured by following the procedure of Example 15 while respectively using the compounds whose methods of production were shown in Controls 1 and 2. These optical recording media were tested in the same manner as in Example 15. They were found to possess optical properties as evinced by reflective indexes invariably of about 75%.

When these optical recording media were used in recording an EFM signal at a linear speed of 1.3 m/s with an output of 6.0 mW by means of a semiconductor laser beam of 780 nm in wavelength, they failed to record the signal because of a high error rate.

The phthalocyanine compounds or phthalocyanine compositions obtained in Examples 1 to 14 and Controls 1 and 2 were tested for lightfastness, solubility, associability, and heat-decomposition properties. The results were as shown in Table 3.

The lightfastness was rated by the following method.

A thin film of dye was formed by dissolving 1 g of a given dye in 20 g of methyl ethyl ketone and applying the solution by the spin coating method on a glass substrate and was used as a sample. This sample was set in place in a xenon lightfastness tester (dosage of irradiation 120,000 Luxes) and the decrease of absorbancy of this sample with time was determined. The lightfastness was rated in terms of the residual ratio of absorbancy after 100 hours' standing on the following three-point scale.

○ Residual ratio of absorbancy after 100 hours' standing Not less than 80%

Δ Residual ratio of absorbancy after 100 hours' standing 30% to less than 80%

X Residual ratio of absorbancy after 100 hours' standing Less than 30%

The solubility of a sample in 2-methoxyethanol was determined and rated on the following three-point scale.

○ Solubility of not less than 5%

Δ Solubility in the range of 2% to less than 5%

X Solubility of less than 2%

A film obtained by dissolving a coating liquid in 2-methoxy-ethanol at a concentration of 5% by weight and applying the solution to a surface by the use of a spin coater was used for the determination of absorption wavelength.

The association peak was rated on the following two-point scale.

○ Association peak of not more than 50%

X Association peak exceeding 50%

For the evaluation of the association peak, the absorbancy of the association peak was calculated based on the absorbancy of the absorption spectrum of the monomer peak as 100% and the outcome of the calculation was rated relative to the standard of 50%.

The heat-decomposition properties was rated in terms of the temperature for starting heat-decomposition determined by the use of a differential thermogravimetric analyzer on the following three-point scale.

○ Temperature for starting heat-decomposition Not higher than 300° C.

Δ Temperature for starting heat-decomposition Exceeding 300° C. to 350° C.

X Temperature for starting heat-decomposition Exceeding 350° C.

TABLE 3

| Example No. | Compound No. | Light-fastness | Solu-bility | Associ-ability | Heat-decomposition properties |
| --- | --- | --- | --- | --- | --- |
| Example 1 | 5 | ○ | ○ | ○ | ○ |
| Example 2 | 6 | ○ | ○ | ○ | ○ |
| Example 3 | 8 | ○ | ○ | ○ | ○ |
| Example 4 | 10 | ○ | ○ | ○ | ○ |
| Example 5 | 11 | ○ | ○ | ○ | ○ |
| Example 6 | 12 | ○ | ○ | ○ | Δ |
| Example 7 | 16 | Δ | ○ | ○ | Δ |
| Example 8 | 18 | Δ | ○ | ○ | Δ |
| Example 9 | 21 and/or 22 | ○ | ○ | ○ | ○ |
| Example 10 | 35 | ○ | ○ | ○ | ○ |
| Example 11 | 49 | ○ | ○ | ○ | ○ |
| Example 12 | 54 | Δ | ○ | ○ | Δ |
| Example 13 | 55 | Δ | ○ | ○ | Δ |
| Example 14 | 35 and 49 | ○ | ○ | ○ | ○ |
| Control 1 | Compound 1 for comparison | ○ | ○ | X | Δ |
| Control 2 | Compound 2 for comparison | ○ | ○ | X | Δ |

Industrial Applicability

As mentioned above, the novel phthalocyanine compound of this invention excels the heretofore known phthalocyanine compounds in absorption properties, solubility, lightfastness, heat-decomposition properties, and economy and possesses an absorption band in a near-infrared region in the range of 650 to 900 nm and, therefore, is practically usable as a near-infrared absorption dye. It can manifest excellent effects particularly when used in a postscript type optical recording medium which possesses compatibility and shareability relative to the players of CD, PHOTO-CD, or CD-ROM.

By the method of production according to this invention, substituents can be introduced to the phthalocyanine skeleton selectively in position. To be more specific, the method of production of this invention allows molecular design of a compound having the near-infrared absorption wavelength region or the solubility varied to suit an application contemplated without requiring to entrain a complicated process of production and, therefore, proves advantageous from the economic point of view. The fluorine atoms in the novel phthalocyanine compound of this invention is rather effective in exalting the solubility of the compound.

The optical recording medium of this invention contains in the recording layer thereof the novel phthalocyanine compound of this invention and, therefore, manifests outstanding effects in such optical properties as reflectance and recording sensitivity, particularly in the recording sensitivity.

We claim:

1. A phthalocyanine compound of a structural formula of phthalocyanine represented by the general formula (1):

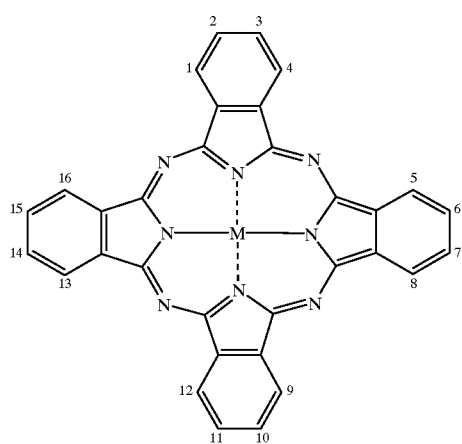

(1)

wherein 1 to 8 of a total 16 positions are substituted with a phenoxy group, one of the ortho positions of the phenoxy group being substituted with an aryl group which may be substituted, all the atoms in the aryl group and the substituent at the residual ortho position excluding the hydrogen atoms assume a total atomic radius of not less than 6.0 Å, and a central atom group M contains a metal atom of not less than trivalence.

2. A phthalocyanine compound according to claim 1, wherein said one of the ortho positions of the phenoxy group is substituted with the aryl group and at least other ortho position of the residual positions is substituted with at least one substituent selected from the group consisting of the substituents of the following (1) to (7) groups:

group (1) $R^1$ group (2) $CO_2R^2$ group (3) $CO_2(CH_2CH_2O)_aR^3$ group (4) $CO_2(CH_2CH_2CH_2O)_bR^4$ group (5) $O[(CH_2)_cO]_dR^5$ group (6) $CO_2(CH_2)_eR^6$

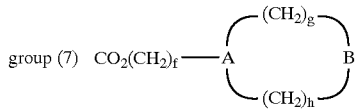

(wherein $R^1$ represents a linear, branched, or cyclic alkyl group of 1 to 20 carbon atoms which may be substituted or an aryl group which may be substituted, $R^2$, $R^3$, $R^4$, and $R^5$ independently represent a linear, branched, or cyclic alkyl group of 1 to 20 carbon atoms which may be substituted or an aryl group which may be substituted, $R^6$ represents an aryl group which may be substituted, A represents a CH group or a nitrogen atom, B represents an oxygen atom, a sulfur atom, a $CH_2$ group, an NH group, or an alkylamino group of 1 to 4 carbon atoms, a, b, c and e each represent an integer in the range of 1 to 5, d and f each represent an integer in the range of 0 to 6, and g and h independently represent an integer in the range of 1 to 4).

3. A phthalocyanine compound according to claim 2, which is represented by the general formula (2):

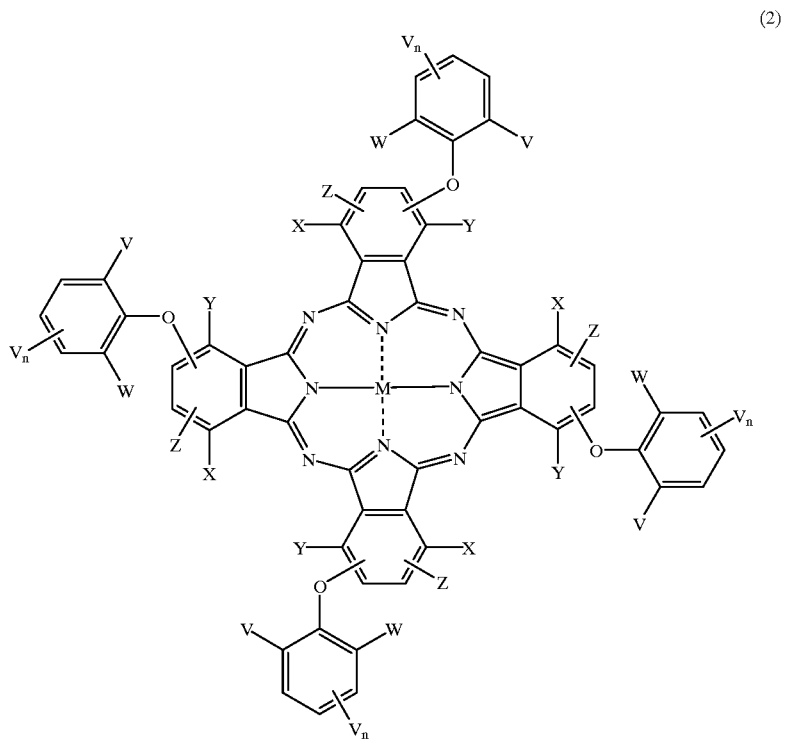

(2)

[wherein X, Y, and Z each represent a hydrogen atom or a halogen atom, W represents an aryl group which may be substituted, V represents at least one substituent selected from the class of the substituents of (1) to (7) groups as defined in claim 2, n represents an integer in the range of 0 to 3, and M represents a metal group containing a metal of not less than trivalence].

4. A phthalocyanine compound according to claim 3, wherein at least one of X, Y, and Z in the general formula (2) is a fluorine atom.

5. A phthalocyanine compound according to claim 3, wherein in the general formula (2), V is $CO_2R^2$ (wherein $R^2$ represents a branched alkyl group of 3 to 20 carbon atoms which may be substituted).

6. A phthalocyanine compound according to claim 3, wherein in the general formula (2), V is $CO_2R^2$ (wherein $R^2$ represents a substituted or unsubstituted secondary or tertiary alkyl group of 5 to 20 carbon atoms and containing 2 to 4 secondary or higher carbon atoms).

7. A phthalocyanine compound according to claim 3, wherein in the general formula (2), V is $CO_2R^2$ (wherein $R^2$ represents a substituted or unsubstituted secondary or tertiary alkyl group of 6 to 10 carbon atoms and containing 2 to 4 secondary or higher carbon atoms), W is a phenyl group which may be substituted, M is a vanadyl, and X, Y, and Z are invariably a fluorine atom.

8. A phthalocyanine compound of a structural formula of phthalocyanine represented by the general formula (1):

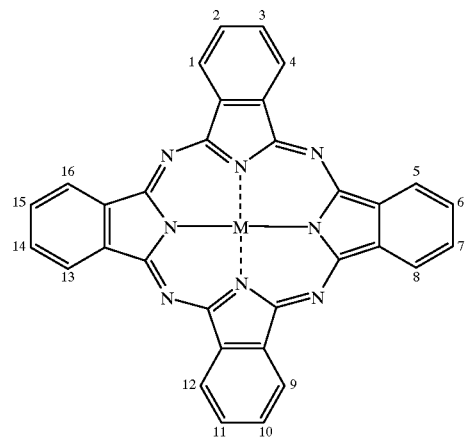

(1)

wherein 1 to 8 of a total 16 positions are substituted with a phenoxy group, one of the ortho positions of the phenoxy group being substituted with an aryl group which may be substituted while the other ortho position being substituted with a bromine atom-containing substituent, and all the atoms in the aryl group and the substituent at the residual ortho position excluding the hydrogen atoms assume a total atomic radius of not less than 6.0 Å.

9. A phthalocyanine compound according to claim 8, which is represented by the general formula (3):

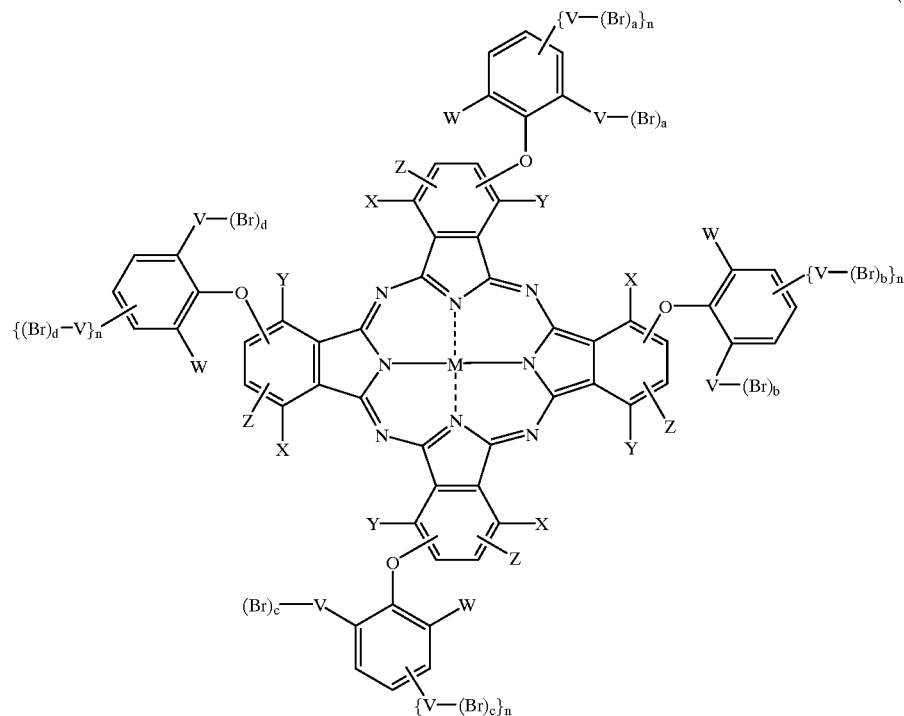

(3)

[wherein X, Y, and Z each represent a hydrogen atom or a halogen atom, a, b, c, and d each represent an integer in the range of 0 to 3, the total number of bromine atoms involved in the substitution is an integer in the range of 2 to 12, n represents an integer in the range of 0 to 3, W represents an aryl group which may be substituted, V represents at least one substituent selected among bromine-substituted residues of the substituents of the following (1) to (3) groups:

group (1) $R^7$ group (2) $CO_2R^8$ group (3) $O[(CH_2)_cO]_dR^9$ (wherein $R^7$, $R^8$, and $R^9$ independently represent a linear, branched, or cyclic alkyl group of 1 to 20 carbon atoms which may be substituted or an aryl group which may be substituted, c represents an integer in the range of 1 to 5, and d represents an integer in the range of 0 to 6) where a, b, c, and d each represent an integer in the range of 1 to 3 or at least one substituent selected among the substituents of (1) to (3) groups mentioned above where a, b, c, and d each represent 0, and M represents a metal, a metal oxide, or a halogenated metal].

10. A phthalocyanine compound according to claim 9, wherein in the general formula (3), at least one of X, Y, and Z is a fluorine atom.

11. A phthalocyanine compound according to claim 9, wherein in the general formula (3), V is $CO_2R^8$ (wherein $R^8$ represents a bromine-substituted residue of a branched alkyl group), W is a phenyl group which may be substituted, X, Y, and Z each represent a fluorine atom, and M is a vanadyl.

12. A method for the production of a phthalocyanine compound set forth in claim 7 which comprises causing either a phthalonitrile compound alone substituted with a phenoxy group to be substituted with an aryl group which may be substituted, or a mixture of said phthalonitrile compound with a phthalonitrile to be unsubstituted with the phenoxy group to react with a metal compound.

13. A method for the production of a phthalocyanine compound according to claim 8, which comprises causing either a phthalonitrile compound alone to be substituted with a phenoxy group to be substituted both with an aryl group which may be substituted and a bromine atom-containing substituent, or a mixture of said phthalonitrile compound with a phthalonitrile to be unsubstituted with the phenoxy group to react with a metal compound.

14. A phthalocyanine composition containing at least one each of the phthalocyanine compounds of the group (I) and those of group (II) shown below:

Group (I): phthalocyanine compounds represented by the general formula (2):

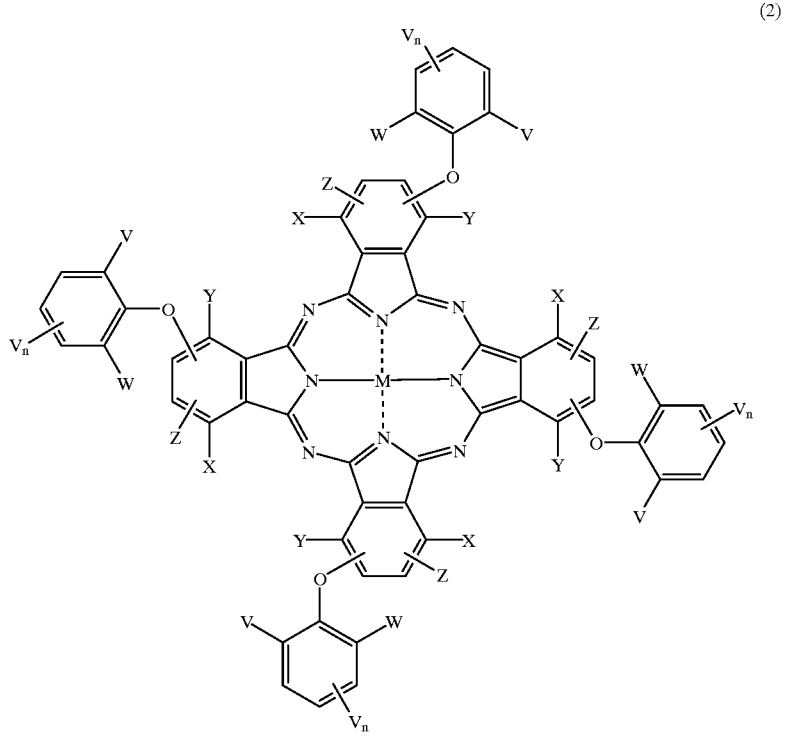

(2)

[wherein X, Y, and Z each represent a hydrogen atom or a halogen atom, W represents an aryl group which may be substituted, V represents at least one substituent selected from the class of the substituents of (1) to (7) groups as defined in claim 2, n represents an integer in the range of 0 to 3, and M represents a metal, a metal oxide, or a halogenated metal]; and Group (II): bromine atom-containing phthalocyanine compounds.

15. A phthalocyanine composition according to claim 14, wherein said bromine atom-containing phthalocyanine is substituted with at least one alkoxy group or aryloxy group.

16. A phthalocyanine composition according to claim 14, wherein at least one of X, Y and Z in the general formula (2) is a fluorine atom, and the bromine atom-containing phthalocyanine compound is a compound represented by the general formula (3).

17. phthalocyanine composition according to claim 14, wherein V in the general formula (2) is $CO_2R^2$ (wherein $R^2$ represents a branched alkyl group of 3 to 20 carbon atoms which may be substituted), and the bromine atom-containing phthalocyanine compound is a compound represented by the general formula (3).

18. A phthalocyanine composition according to claim 14, wherein V in the general formula (2) is $CO_2R^2$ (wherein $R^2$ represents a secondary or tertiary alkyl group of 5 to 20 carbon atoms and containing 2 to 4 secondary or higher carbon atoms which may be substituted), and the bromine atom-containing phthalocyanine compound is a compound represented by the general formula (3).

19. A phthalocyanine composition according claim 14, wherein at least one of X, Y and Z in the general formula (2) is a fluorine atom, and the bromine atom-containing phthalocyanine compound is a compound represented by the general formula (3) (wherein at least one of X, Y and Z is a fluorine atom).

20. A phthalocyanine composition according to claim 14, wherein V in the general formula (2) is $CO_2R^2$ (wherein $R^2$ represents a branched alkyl group of 3 to 20 carbon atoms which may be substituted) and the bromine atom-containing phthalocyanine compound is a compound represented by the general formula (3) (wherein at least one of X, Y and Z is a fluorine atom).

21. A phthalocyanine composition according to claim 14, wherein V in the general formula (2) is $CO_2R^2$ (wherein $R^2$ represents a secondary or tertiary alkyl group of 5 to 20 carbon atoms and containing 2 to 4 secondary or higher carbon atoms which may be substituted), and the bromine atom-containing phthalocyanine compound is a compound represented by the general formula (3) (wherein at least one of X, Y and Z is a fluorine atom).

22. An optical recording medium containing a phthalocyanine compound or composition set forth in claim 1 and claims 14 to 21 in a recording layer provided on a substrate.

23. A postscript type optical recording medium adapted for a compact disc comprising a recording layer and a metallic reflecting layer provided on a transparent substrate of resin, wherein said recording layer is the recording layer set forth in claim 22.

24. A method for the production of the phthalocyanine compound of claim 1, the method comprising
   (a) causing a phthalonitrile compound alone, substituted with a phenoxy group to be substituted with an aryl group, which may be substituted, to react with a metal compound in benzonitrile; or
   (b) causing a mixture of the phthalonitrile compound substituted with the phenoxy group and a phthalonitrile compound to be unsubstituted with the phenoxy group to react with the metal compound in benzonitrile.

25. A method for the production of the phthalocyanine compound of claim 8, the method comprising
   (a) causing a phthalonitrile compound alone, to be substituted with a phenoxy group to be substituted both with an aryl group, which may be substituted, and a bromine atom-containing substituent, to react with a metal compound in benzonitrile; or
   (b) causing a mixture of the phthalonitrile compound substituted with the phenoxy group with a phthalonitrile to be unsubstituted with the phenoxy group to react with the metal compound in benzonitrile.

* * * * *